United States Patent
Lomax et al.

(10) Patent No.: US 8,828,118 B2
(45) Date of Patent: Sep. 9, 2014

(54) STAGED BLOWDOWN OF ADSORBENT BED

(75) Inventors: Franklin D. Lomax, Hector, NY (US);
Richard S. Todd, Boonton, NJ (US);
Brian A. Zakrajsek, Bloomfield, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 150 days.

(21) Appl. No.: 13/695,487

(22) PCT Filed: Apr. 28, 2011

(86) PCT No.: PCT/US2011/034253
§ 371 (c)(1),
(2), (4) Date: Oct. 31, 2012

(87) PCT Pub. No.: WO2011/139813
PCT Pub. Date: Nov. 10, 2011

(65) Prior Publication Data
US 2013/0042754 A1     Feb. 21, 2013

Related U.S. Application Data

(60) Provisional application No. 61/331,612, filed on May 5, 2010.

(51) Int. Cl.
*B01D 53/053* (2006.01)
*B01D 53/047* (2006.01)

(52) U.S. Cl.
CPC .... *B01D 53/047* (2013.01); *B01D 2259/40011* (2013.01); *B01D 53/053* (2013.01); *B01D 2259/40003* (2013.01); *B01D 2259/40009* (2013.01); *B01D 2259/404* (2013.01)
USPC ........... 95/22; 95/96; 95/103; 96/114; 96/116

(58) Field of Classification Search
CPC ............... B01D 53/047; B01D 53/053; B01D 2259/40003; B01D 2259/40007; B01D 2259/40009; B01D 2259/40011–2259/40049
USPC .............. 95/19, 21, 22, 96–103; 96/113, 114, 96/116, 121, 144
See application file for complete search history.

(56) References Cited

U.S. PATENT DOCUMENTS

| | | | |
|---|---|---|---|
| 4,298,019 A | 11/1981 | Daransky et al. | |
| 4,761,165 A * | 8/1988 | Stocker et al. | 95/22 |
| 5,015,272 A * | 5/1991 | Okada et al. | 95/26 |
| 6,099,618 A | 8/2000 | Monereau | |
| 6,447,582 B1 * | 9/2002 | de Souza | 96/121 |
| 6,585,804 B2 * | 7/2003 | Kleinberg et al. | 95/101 |

(Continued)

*Primary Examiner* — Frank Lawrence
(74) *Attorney, Agent, or Firm* — Alix, Yale & Ristas, LLP

(57) ABSTRACT

A pressure swing adsorption (PSA) system using two or more valves for controlling the flow of gases entering or exiting a bed of adsorbents is disclosed, where the two or more valves are opened sequentially (i.e., in at least two actions separated by a delay in time). The sequential opening of the valves may increase the degree to which adsorbed species are purged from the bed, and also facilitates more rapid execution of certain time steps of the PSA cycle, thus increasing adsorbent productivity The sequential opening of the valves may also allow for verification of valve operation by measuring either the absolute value, the slope (derivative) or the rate of change of derivative of the pressure, either in the adsorbent bed, in the downstream manifold, or in a volume of gas held in a buffer vessel.

51 Claims, 17 Drawing Sheets

(56) References Cited

U.S. PATENT DOCUMENTS

| | | |
|---|---|---|
| 7,604,682 B2 | 10/2009 | Seaton |
| 7,674,319 B2 | 3/2010 | Lomax, Jr. et al. |
| 7,740,687 B2 * | 6/2010 | Reinhold, III .................. 95/96 |
| 8,034,164 B2 * | 10/2011 | Lomax et al. .................. 95/121 |
| 8,551,217 B2 * | 10/2013 | Baksh et al. .................. 95/96 |

* cited by examiner

| Valve on Vessel | Blowdown | Rcv Purge | Rcv EQ3 | Rcv EQ 2 | Rcv EQ1 | Prod Repress | | | Adsorb | | | | Prv EQ1 | Prv EQ2 | Prv EQ3 | Prv Purge |
|---|---|---|---|---|---|---|---|---|---|---|---|---|---|---|---|---|
| Pilot Feed | Closed | Closed | Closed | Closed | Closed | Closed | Open | Open | Open | Open | Open | Open | Closed | Closed | Closed | Closed |
| Feed | Closed | Closed | Closed | Closed | Closed | Closed | Delay | Open | Open | Open | Open | Open | Closed | Closed | Closed | Closed |
| Pilot Waste-gas | Open | Open | Closed | Closed | Closed | Closed | Closed | Closed | Closed | Closed | Closed | Closed | Closed | Closed | Closed | Closed |
| Waste-gas | Delay | Open | Closed | Closed | Closed | Closed | Closed | Closed | Closed | Closed | Closed | Closed | Closed | Closed | Closed | Closed |
| Pilot Product | Closed | Closed | Closed | Closed | Closed | Open | Open | Open | Open | Open | Open | Open | Closed | Closed | Closed | Closed |
| Product | Closed | Closed | Closed | Closed | Closed | Delay | Open | Open | Open | Open | Open | Open | Closed | Closed | Closed | Closed |
| Pilot Purge | Closed | Open | Open | Closed | Closed | Closed | Closed | Closed | Closed | Closed | Closed | Closed | Closed | Closed | Closed | Open |
| Purge | Closed | Open | Open | Open | Open | Delay | Closed | Closed | Closed | Closed | Closed | Closed | Closed | Closed | Closed | Delay |
| Pilot Eq | Closed | Closed | Closed | Open | Open | Closed | Closed | Closed | Closed | Closed | Closed | Closed | Open | Open | Closed | Closed |
| Eq | Closed | Closed | Closed | Open | Open | Closed | Closed | Closed | Closed | Closed | Closed | Closed | Delay | Delay | Closed | Closed |
| Valve on Vessel | Prv EQ3 | Prv Purge | Blowdown | Rcv Purge | Rcv EQ3 | Rcv EQ2 | Rcv EQ1 | Prod Repress | | | Adsorb | | Prv EQ1 | | | |
| Pilot Feed | Closed | Closed | Closed | Closed | Closed | Closed | Closed | Closed | Open | Open | Open | Open | Open | Open | Closed | Closed |
| Feed | Closed | Closed | Closed | Closed | Closed | Closed | Closed | Closed | Delay | Open | Open | Open | Open | Open | Closed | Closed |
| Pilot Waste-gas | Closed | Closed | Open | Open | Open | Open | Closed | Closed | Closed | Closed | Closed | Closed | Closed | Closed | Closed | Closed |
| Waste-gas | Closed | Closed | Delay | Delay | Delay | Open | Closed | Closed | Closed | Closed | Closed | Closed | Closed | Closed | Closed | Closed |
| Pilot Product | Closed | Closed | Closed | Closed | Closed | Closed | Closed | Open | Open | Open | Open | Open | Open | Open | Closed | Closed |
| Product | Closed | Closed | Closed | Closed | Closed | Closed | Closed | Open | Delay | Open | Open | Open | Open | Open | Closed | Closed |
| Pilot Purge | Open | Open | Open | Open | Closed | Closed | Closed | Closed | Closed | Closed | Closed | Closed | Closed | Closed | Closed | Closed |
| Purge | Delay | Delay | Delay | Open | Closed | Closed | Closed | Closed | Closed | Closed | Closed | Closed | Closed | Closed | Closed | Closed |
| Pilot Eq | Closed | Closed | Closed | Closed | Closed | Closed | Open | Open | Closed | Closed | Closed | Closed | Closed | Closed | Open | Open |
| Eq | Closed | Closed | Closed | Closed | Closed | Closed | Open | Open | Closed | Closed | Closed | Closed | Closed | Closed | Delay | Delay |
| | Step 1 | Step 2 | Step 3 | Step 4 | Step 5 | Step 6 | Step 7 | Step 8 | Step 9 | Step 10 | Step 11 | Step 12 | Step 13 | Step 14 | Step 15 | Step 16 |

VESSEL NO. 1 / VESSEL NO. 2

Figure 9C:
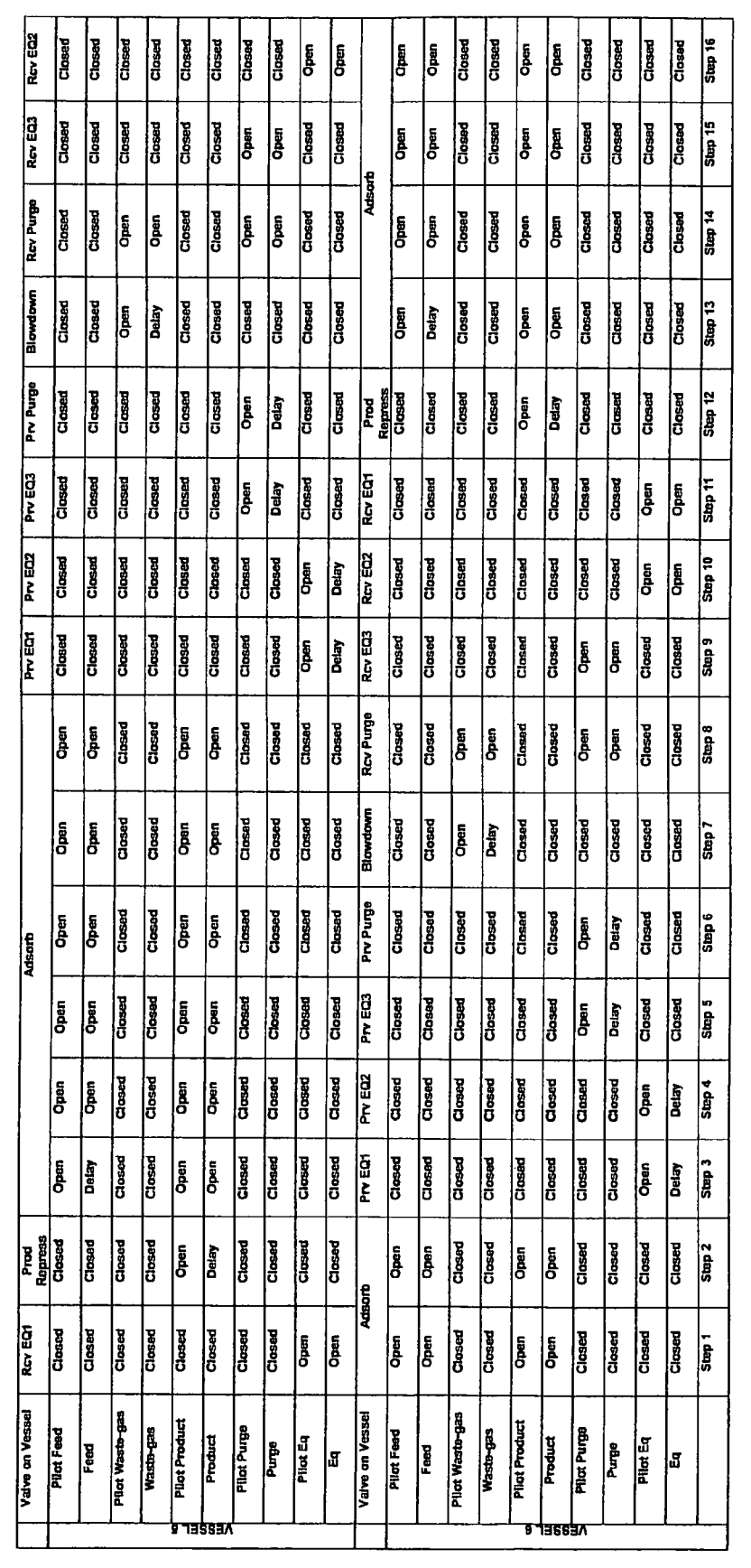

Valve cycle chart (Vessel 5 / Vessel 6), 16 steps:

| Step | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Phase | Rcv EQ1 | Prod Repress | Prv EQ1 | Prv EQ2 | Prv EQ3 | Adsorb | Adsorb | Adsorb | Prv EQ1 | Prv EQ2 | Prv EQ3 | Prv Purge | Blowdown | Rcv Purge | Rcv EQ3 | Rcv EQ2 |

(Full valve-by-valve state table per vessel is shown in the figure; individual cell states are Open/Closed/Delay as depicted.)

| | Valve on Vessel | Adsorb | | | | | Prv EQ1 | Prv EQ2 | Prv EQ3 | Prv Purge | Blowdown | Rcv Purge | Rcv EQ3 | Rcv EQ2 | Rcv EQ1 | Prod Repress |
|---|---|---|---|---|---|---|---|---|---|---|---|---|---|---|---|---|
| VESSEL 7 | Pilot Feed | Open | Open | Open | Open | Open | Closed | Closed | Closed | Closed | Closed | Closed | Closed | Closed | Closed | Closed |
| | Feed | Delay | Open | Open | Open | Open | Closed | Closed | Closed | Closed | Closed | Closed | Closed | Closed | Closed | Closed |
| | Pilot Waste-gas | Closed | Closed | Closed | Closed | Closed | Closed | Closed | Closed | Closed | Open | Open | Closed | Closed | Closed | Closed |
| | Waste-gas | Closed | Closed | Closed | Closed | Closed | Closed | Closed | Closed | Closed | Delay | Open | Closed | Closed | Closed | Closed |
| | Pilot Product | Open | Open | Open | Open | Open | Closed | Closed | Closed | Closed | Closed | Closed | Closed | Closed | Closed | Open |
| | Product | Open | Open | Open | Open | Open | Closed | Closed | Closed | Closed | Closed | Closed | Closed | Closed | Closed | Delay |
| | Pilot Purge | Closed | Closed | Closed | Closed | Closed | Closed | Closed | Open | Open | Closed | Open | Open | Closed | Closed | Closed |
| | Purge | Closed | Closed | Closed | Closed | Closed | Closed | Closed | Delay | Open | Closed | Open | Open | Closed | Closed | Closed |
| | Pilot Eq | Closed | Closed | Closed | Closed | Closed | Open | Open | Closed | Closed | Closed | Closed | Closed | Open | Open | Closed |
| | Eq | Closed | Closed | Closed | Closed | Closed | Delay | Delay | Closed | Closed | Closed | Closed | Closed | Open | Open | Closed |
| | Valve on Vessel | | | | | Adsorb | | | | | | | | | | |
| | | Prv EQ1 | Prv EQ2 | Prv EQ3 | Prv Purge | Blowdown | Rcv Purge | Rcv EQ3 | Rcv EQ2 | Rcv EQ1 | Prod Repress | | | | | |
| VESSEL 8 | Pilot Feed | Closed | Closed | Closed | Closed | Closed | Closed | Closed | Closed | Open | Open | Open | Closed | Open | Open | Closed |
| | Feed | Closed | Closed | Closed | Closed | Closed | Closed | Closed | Closed | Delay | Open | Open | Closed | Delay | Closed | Open |
| | Pilot Waste-gas | Closed | Closed | Closed | Closed | Closed | Open | Open | Closed | Closed | Closed | Closed | Closed | Closed | Closed | Closed |
| | Waste-gas | Closed | Closed | Closed | Closed | Closed | Delay | Open | Closed | Closed | Closed | Closed | Closed | Closed | Closed | Closed |
| | Pilot Product | Open | Open | Open | Open | Open | Closed | Closed | Closed | Closed | Closed | Closed | Closed | Open | Open | Open |
| | Product | Open | Open | Open | Open | Open | Closed | Closed | Closed | Closed | Closed | Closed | Closed | Delay | Open | Open |
| | Pilot Purge | Closed | Closed | Closed | Closed | Closed | Closed | Open | Open | Open | Closed | Closed | Closed | Closed | Closed | Closed |
| | Purge | Closed | Closed | Closed | Closed | Closed | Closed | Delay | Open | Open | Closed | Closed | Closed | Closed | Closed | Closed |
| | Pilot Eq | Closed | Open | Open | Delay | Delay | Open | Closed | Closed | Closed | Closed | Open | Open | Closed | Closed | Closed |
| | Eq | Closed | Closed | Closed | Delay | Delay | Delay | Closed | Closed | Closed | Closed | Open | Open | Closed | Closed | Closed |
| | | Step 1 | Step 2 | Step 3 | Step 4 | Step 5 | Step 6 | Step 7 | Step 8 | Step 9 | Step 10 | Step 11 | Step 12 | Step 13 | Step 14 | Step 15 | Step 16 |

| | Valve on Vessel | Rcv EQ2 | Rcv EQ1 | Prod Repress | | | | Adsorb | | | | Prv EQ1 | Prv EQ2 | Prv EQ3 | Prv EQ4 | Prv Purge | Blowdown | Rcv Purge | Rcv EQ4 | Rcv EQ3 |
|---|---|---|---|---|---|---|---|---|---|---|---|---|---|---|---|---|---|---|---|---|
| VESSEL NO. 5 | Pilot Feed | Closed | Closed | Closed | Open | Open | Open | Open | Open | Open | Open | Closed | Closed | Closed | Closed | Closed | Closed | Closed | Closed | Closed |
| | Feed | Closed | Closed | Closed | Delay | Open | Open | Open | Open | Open | Open | Closed | Closed | Closed | Closed | Closed | Closed | Closed | Closed | Closed |
| | Pilot Waste-gas | Closed | Closed | Closed | Closed | Closed | Closed | Closed | Closed | Closed | Closed | Closed | Closed | Closed | Closed | Closed | Open | Open | Closed | Closed |
| | Waste-gas | Closed | Closed | Closed | Closed | Closed | Closed | Closed | Closed | Closed | Closed | Closed | Closed | Closed | Closed | Closed | Delay | Closed | Closed | Closed |
| | Pilot Product | Closed | Closed | Open | Open | Open | Open | Open | Open | Open | Closed | Closed | Closed | Closed | Closed | Closed | Closed | Closed | Closed | Closed |
| | Product | Closed | Closed | Delay | Open | Open | Open | Open | Open | Open | Open | Closed | Closed | Closed | Closed | Closed | Closed | Closed | Closed | Closed |
| | Pilot Purge | Closed | Closed | Closed | Closed | Closed | Closed | Closed | Closed | Closed | Closed | Closed | Closed | Closed | Closed | Open | Closed | Closed | Closed | Closed |
| | Purge | Closed | Closed | Closed | Closed | Closed | Closed | Closed | Closed | Closed | Closed | Closed | Closed | Closed | Closed | Delay | Closed | Open | Closed | Closed |
| | Pilot Eq #1 | Closed | Closed | Closed | Closed | Closed | Closed | Closed | Closed | Closed | Closed | Closed | Closed | Open | Open | Closed | Closed | Closed | Open | Open |
| | Eq #1 | Closed | Closed | Closed | Closed | Closed | Closed | Closed | Closed | Closed | Closed | Closed | Closed | Delay | Delay | Closed | Closed | Closed | Open | Open |
| | Pilot Eq #2 | Open | Open | Closed | Closed | Closed | Closed | Closed | Closed | Closed | Closed | Open | Open | Closed | Closed | Closed | Closed | Closed | Closed | Closed |
| | Eq #2 | Open | Open | Closed | Closed | Closed | Closed | Closed | Closed | Closed | Closed | Delay | Delay | Closed | Closed | Closed | Closed | Closed | Closed | Closed |
| VESSEL NO. 6 | Valve on Vessel | Adsorb | Prv EQ1 | Prv EQ2 | Prv EQ3 | Prv EQ4 | Prv Purge | Blowdown | Rcv Purge | Rcv EQ4 | Rcv EQ3 | Rcv EQ2 | Rcv EQ1 | Prod Repress | | | | Adsorb | | |
| | Pilot Feed | Open | Closed | Closed | Closed | Closed | Closed | Closed | Closed | Closed | Closed | Closed | Closed | Closed | Open | Open | Open | Open | Open | Open |
| | Feed | Open | Closed | Closed | Closed | Closed | Delay | Closed | Closed | Closed | Closed | Closed | Closed | Closed | Delay | Open | Open | Open | Open | Open |
| | Pilot Waste-gas | Closed | Closed | Closed | Closed | Closed | Closed | Open | Open | Closed | Closed | Closed | Closed | Closed | Closed | Closed | Closed | Closed | Closed | Closed |
| | Waste-gas | Closed | Closed | Closed | Closed | Closed | Closed | Open | Delay | Closed | Closed | Closed | Closed | Closed | Closed | Closed | Closed | Closed | Closed | Closed |
| | Pilot Product | Open | Closed | Closed | Closed | Open | Closed | Closed | Closed | Closed | Closed | Closed | Closed | Open | Open | Open | Open | Open | Open | Open |
| | Product | Open | Closed | Closed | Closed | Delay | Closed | Closed | Closed | Closed | Closed | Closed | Closed | Delay | Open | Open | Open | Open | Open | Open |
| | Pilot Purge | Closed | Closed | Closed | Closed | Closed | Open | Closed | Closed | Closed | Closed | Closed | Closed | Closed | Closed | Closed | Closed | Open | Closed | Closed |
| | Purge | Closed | Closed | Closed | Closed | Closed | Delay | Closed | Closed | Closed | Closed | Closed | Closed | Closed | Closed | Closed | Closed | Delay | Closed | Closed |
| | Pilot Eq #1 | Closed | Open | Open | Closed | Closed | Closed | Closed | Closed | Closed | Closed | Closed | Open | Open | Open | Open | Open | Closed | Closed | Closed |
| | Eq #1 | Closed | Open | Open | Closed | Closed | Closed | Closed | Closed | Closed | Closed | Closed | Delay | Delay | Delay | Open | Delay | Closed | Closed | Closed |
| | Pilot Eq #2 | Closed | Closed | Closed | Open | Open | Closed | Closed | Closed | Closed | Open | Open | Closed | Closed | Closed | Closed | Closed | Closed | Closed | Closed |
| | Eq #2 | Closed | Closed | Closed | Open | Open | Closed | Closed | Closed | Closed | Open | Open | Closed | Delay | Closed | Closed | Closed | Closed | Closed | Closed |
| | | Step 1 | Step 2 | Step 3 | Step 4 | Step 5 | Step 6 | Step 7 | Step 8 | Step 9 | Step 10 | Step 11 | Step 12 | Step 13 | Step 14 | Step 15 | Step 16 | Step 17 | Step 18 |

| Valve on Vessel | | Step 1 | Step 2 | Step 3 | Step 4 | Step 5 | Prv EQ1 Step 6 | Prv EQ2 Step 7 | Prv EQ3 Step 8 | Prv EQ4 Step 9 | Prv Purge Step 10 | Blowdown Step 11 | Rcv Purge Step 12 | Rcv EQ4 Step 13 | Rcv EQ3 Step 14 | Rcv EQ2 Step 15 | Rcv EQ1 Step 16 | Prod Repress Step 17 | Adsorb Step 18 |
|---|---|---|---|---|---|---|---|---|---|---|---|---|---|---|---|---|---|---|---|
| VESSEL NO. 9 | Pilot Feed | Open | Open | Open | Open | Open | Closed | Closed | Closed | Closed | Closed | Closed | Closed | Closed | Closed | Closed | Closed | Closed | Open |
| | Feed | Open | Open | Open | Open | Open | Closed | Closed | Closed | Closed | Closed | Closed | Closed | Closed | Closed | Closed | Closed | Closed | Delay |
| | Pilot Waste-gas | Closed | Closed | Closed | Closed | Closed | Closed | Closed | Closed | Closed | Closed | Closed | Closed | Closed | Closed | Closed | Closed | Closed | Closed |
| | Waste-gas | Closed | Closed | Closed | Closed | Closed | Closed | Closed | Closed | Closed | Closed | Open | Open | Closed | Closed | Closed | Closed | Closed | Closed |
| | Pilot Product | Open | Open | Open | Open | Open | Closed | Closed | Closed | Closed | Closed | Delay | Open | Closed | Closed | Closed | Closed | Closed | Open |
| | Product | Open | Open | Open | Open | Open | Closed | Closed | Closed | Closed | Closed | Closed | Open | Closed | Closed | Closed | Closed | Open | Open |
| | Pilot Purge | Closed | Closed | Closed | Closed | Closed | Closed | Closed | Closed | Closed | Open | Closed | Open | Closed | Closed | Closed | Closed | Delay | Closed |
| | Purge | Closed | Closed | Closed | Closed | Closed | Closed | Closed | Closed | Closed | Delay | Closed | Delay | Closed | Closed | Closed | Closed | Closed | Closed |
| | Pilot Eq #1 | Closed | Closed | Closed | Closed | Closed | Closed | Closed | Open | Open | Closed | Closed | Closed | Open | Open | Closed | Closed | Closed | Closed |
| | Eq #1 | Closed | Closed | Closed | Closed | Closed | Closed | Closed | Delay | Delay | Closed | Closed | Closed | Open | Open | Closed | Closed | Closed | Closed |
| | Pilot Eq #2 | Closed | Closed | Closed | Closed | Closed | Open | Open | Closed | Closed | Closed | Closed | Closed | Closed | Closed | Open | Open | Closed | Closed |
| | Eq #2 | Closed | Closed | Closed | Closed | Closed | Delay | Delay | Closed | Closed | Closed | Closed | Closed | Closed | Closed | Open | Open | Closed | Closed |

STAGED BLOWDOWN OF ADSORBENT BED

CROSS-REFERENCE TO RELATED APPLICATIONS

This is the national stage of International Application No. PCT/US2011/034253 filed Apr. 28, 2011, which claims priority from U.S. Provisional Patent Application Ser. No. 61/331,612 filed May 5, 2010.

FIELD OF THE DISCLOSURE

Embodiments disclosed herein generally relate to pressure swing adsorption systems. More specifically, embodiments disclosed herein relate to methods and apparatus for controlling the flow of gases entering or exiting a bed of adsorbent.

BACKGROUND

Pressure Swing Adsorption (PSA) is a technique used to fractionate mixtures of gases to provide at least one purified product gas and a raffinate byproduct mixture. PSA has been successfully used to separate hydrogen from other gases, oxygen and nitrogen from air, and helium from natural gas, among others.

Early PSA systems generally used four adsorbent vessels operated in parallel. An example of this is U.S. Pat. No. 3,430,418 to Wagner. Later improvements to Wagner's process added an additional pressure equalization step while retaining four adsorbent beds (e.g., U.S. Pat. No. 3,564,816 to Batta) and subsequently added even more pressure equalization steps to seven or more beds in U.S. Pat. No. 3,986,849 to Fuderer et al. These increases in the number of pressure equalizations and the number of adsorbent vessels were implemented to increase the product recovery and the adsorbent productivity. Unfortunately, the increases in performance were accompanied by an increase in the number of valves required from thirty-one for the Wagner process to thirty-three for the Batta process to a minimum of forty-four for the Fuderer et al. process.

The performance of PSA cycles is commonly measured based upon several criteria. The first is product recovery at a given impurity level, the fraction of the product species in the total feed stream that is delivered as purified product. A second measure is the productivity of the adsorbent, which is related to the proportion of the PSA cycle during which product is delivered compared to the total length of the cycle. In order to maximize one or both of these parameters at fixed feed compositions, a number of approaches have been described in other systems.

Wagner describes the use of gas stored in the pressurized beds to repressurize one other vessel which had been purged, then to subsequently purge another vessel before the pressure in the first vessel was depleted. Batta subsequently describes that a second pressure equalization could be added to the first, and that this would improve recovery meaningfully. Batta retained the provision of purge gas in his cycle. Fuderer et al. extended this approach to a third pressure equalization, and taught that the purest gas withdrawn from a bed should always be the last gas admitted to any other bed being repressurized. Batta's four vessel cycle was constituted such that less pure gas was admitted to the vessel being pressurized than was truly desirable. Further, Fuderer et al.'s invention allowed for a higher adsorbent productivity than was achievable with previous cycles, because the fraction of time in the cycle allocated to adsorption was higher due to the details of the valve switching logic.

Although these methods facilitate excellent product recovery and adsorbent productivity, they do so at the expense of a high degree of complexity. Wagner's original process employed four vessels and thirty-one valves to facilitate one pressure equalization, and purging of one other vessel. Batta increased this total to thirty-three valves and four vessels for his cycle with two equalizations. Both of these four bed cycles produce gas from a given vessel twenty-five percent of the time. Batta also provided a five vessel system with forty-three valves to re-order the equalizations to provide the desired repressurization with gases increasing continuously in purity. This cycle produced from a given vessel only twenty percent of the time. Fuderer et al.'s most simple cycle providing three equalizations and a purging step required nine vessels and fifty-five valves. This cycle produced thirty-three percent of the time, a significant increase over the cycles of Batta and Wagner. Although these cycles progressed in the critical areas of recovery and productivity, they did so at the expense of much increased mechanical complexity. This increase in complexity is accompanied by increases in system volume, mass, assembly time, and capital cost. Furthermore, the large increase in the number of valves over time significantly reduces the reliability of the PSA system; as such PSA systems are single point of failure systems, which must be shut down even if one valve fails.

Recent efforts have been made to reduce complexity in order to address its attendant problems. U.S. Pat. No. 4,761,165 to Stocker implemented the process of Wagner using four vessels and eighteen valves, of which four could be proportionally-controlled valves. U.S. Pat. No. 6,146,450 to Duhayer et al. describes a means for reducing complexity by arranging pipe fittings optimally, although this approach does not materially alter the PSA cycle in terms of valve or vessel count. A process including additional mechanical simplification is described in U.S. Pat. No. 6,755,895 to Lomax et al.

U.S. Pat. No. 6,858,065, also to Lomax et al., discloses a process including a first equalization step having at least two stages where the pressure decreases, and a second equalization step having at least two stages where the pressure increases.

U.S. Pat. No. 7,674,319, also to Lomax et al., discloses a PSA system with a control system to monitor the performance and operation of the PSA system, including multiple pressure transducers located at various points in the system. Stocker et al. also disclose use of multiple pressure transducers on the adsorption vessels, feed lines and product lines which are provided in order to progressively control the opening of proportionally-opening valves to prevent adsorbent fluidization.

U.S. Pat. No. 6,755,895 to Lomax, et al discloses a system of fixed, flow restricting orifices to limit the velocity of gases exiting an adsorbent vessel without using any feedback control or proportional valves.

It has been found that in the limit of extremely-rapid cyclic operation, that the flowrate achieved through the invention of Lomax '895 may undesirably limit the rapidity with which a pressure equalization step can be executed, thus limiting adsorbent productivity.

SUMMARY OF THE DISCLOSURE

Several of the above-mentioned processes may attain a simplification in the total number of valves used relative to the process of Wagner. Others may provide for multiple measurement devices for monitoring and control of the PSA system to determine valve failure and system performance.

It has been surprisingly found that simplification of the process and improvements in system performance and monitoring may be attained by using two or more valves for controlling the flow of gases entering or exiting a bed of adsorbents, where the two or more valves are opened sequentially (i.e., in at least two actions separated by a delay in time). The sequential opening of the valves may increase the degree to which adsorbed species are purged from the bed, and also facilitates more rapid execution of certain time steps of the PSA cycle, thus increasing adsorbent productivity The sequential opening of the valves may also allow for verification of valve operation by measuring either the absolute value, the slope (derivative) or the rate of change of derivative of the pressure, either in the adsorbent bed, in the downstream manifold, or in a volume of gas held in a buffer vessel. The resulting system may have the same or reduced piece count (including both valves and sensors) as compared to prior processes, and thus reduced risk of malfunction, while resulting in improvements in both PSA system operation and control.

In one aspect, embodiments disclosed herein relate to a pressure swing adsorption system, including: a plurality of vessels having one or more layers of adsorbent material therein; a feed gas channel connected to the plurality of vessels; a product recovery channel connected to the plurality of vessels; a purge gas channel connected to the plurality of vessels; a waste gas channel connected to the plurality of vessel; and an equalization channel connected to the plurality of vessels; the product recovery channel being connected to each of the plurality of vessels via a manifold comprising at least two valves in a parallel flow arrangement; and a control system configured to open the at least two valves sequentially.

In another aspect, embodiments disclosed herein relate to a pressure swing adsorption system, including: a plurality of vessels having one or more layers of adsorbent material therein; a feed gas channel connected to the plurality of vessels; a product recovery channel connected to the plurality of vessels; a purge gas channel connected to the plurality of vessels; a waste gas channel connected to the plurality of vessel; and an equalization channel connected to the plurality of vessels; the purge gas channel being connected to each of the plurality of vessels via a manifold comprising at least two valves in a parallel flow arrangement; and a control system configured to open the at least two valves sequentially.

In another aspect, embodiments disclosed herein relate to a pressure swing adsorption system, including: a plurality of vessels having one or more layers of adsorbent material therein; a feed gas channel connected to the plurality of vessels; a product recovery channel connected to the plurality of vessels; a purge gas channel connected to the plurality of vessels; a waste gas channel connected to the plurality of vessel; and an equalization channel connected to the plurality of vessels; the waste gas channel being connected to each of the plurality of vessels via a manifold comprising at least two valves in a parallel flow arrangement; and a control system configured to open the at least two valves sequentially.

In another aspect, embodiments disclosed herein relate to a pressure swing adsorption system, including: a plurality of vessels having one or more layers of adsorbent material therein; a feed gas channel connected to the plurality of vessels; a product recovery channel connected to the plurality of vessels; a purge gas channel connected to the plurality of vessels; a waste gas channel connected to the plurality of vessel; and an equalization channel connected to the plurality of vessels; the equalization channel being connected to each of the plurality of vessels via a manifold comprising at least two valves in a parallel flow arrangement; and a control system configured to open the at least two valves sequentially.

In another aspect, embodiments disclosed herein relate to a pressure swing adsorption system, including: a plurality of vessels having one or more layers of adsorbent material therein; a feed gas channel connected to the plurality of vessels; a product recovery channel connected to the plurality of vessels; a purge gas channel connected to the plurality of vessels; a waste gas channel connected to the plurality of vessel; and an equalization channel connected to the plurality of vessels; the product recovery channel being connected to each of the plurality of vessels via a manifold comprising at least two valves in a parallel flow arrangement; the purge gas channel being connected to each of the plurality of vessels via a manifold comprising at least two valves in a parallel flow arrangement; the waste gas channel being connected to each of the plurality of vessels via a manifold comprising at least two valves in a parallel flow arrangement; the equalization channel being connected to each of the plurality of vessels via a manifold comprising at least two valves in a parallel flow arrangement; and a control system configured to: open the at least two valves in the manifold connecting the product recovery channel sequentially; open the at least two valves in the manifold connecting the purge gas channel sequentially; open the at least two valves in the manifold connecting the waste gas channel sequentially; and open the at least two valves in the manifold connecting the equalization channel sequentially.

In any of the above embodiments, the system may further include one or more of the following: a pressure sensor for measuring a pressure in each of the plurality of vessels; a pressure sensor for measuring a pressure in the product recovery channel; and a pressure sensor for measuring a pressure in a buffer vessel fluidly connected to the product recovery channel; a pressure sensor for measuring a pressure in the purge gas channel; and a pressure sensor for measuring a pressure in a buffer vessel fluidly connected to the purge gas channel; a pressure sensor for measuring a pressure in the waste gas channel; and a pressure sensor for measuring a pressure in a buffer vessel fluidly connected to the waste gas channel; a pressure sensor for measuring a pressure in the equalization channel; and a pressure sensor for measuring a pressure in a buffer vessel fluidly connected to the equalization channel.

In any of the above embodiments, the control system may be configured to determine a valve failure based upon at least one of: the pressure measured by at least one of, when present, the pressure sensor in each of the plurality of vessels, the pressure sensor in the product recovery channel, and the pressure sensor in the buffer vessel fluidly connected to the product recovery channel during the sequential opening of the at least two valves in the manifold connecting the product recovery channel; the pressure measured by at least one of, when present, the pressure sensor in each of the plurality of vessels, the pressure sensor in the purge gas channel, and the pressure sensor in the buffer vessel fluidly connected to the purge gas channel during the sequential opening of the at least two valves in the manifold connecting the purge gas channel; the pressure measured by at least one of, when present, the pressure sensor in each of the plurality of vessels, the pressure sensor in the waste gas channel, and the pressure sensor in the buffer vessel fluidly connected to the waste gas channel during the sequential opening of the at least two valves in the manifold connecting the waste gas channel; the pressure measured by at least one of, when present, the pressure sensor in each of the plurality of vessels, the pressure sensor in the equalization channel, and the pressure sensor in the buffer vessel fluidly connected to the equalization channel during the sequential opening of the at least two valves in the manifold connecting the equalization channel.

In any of the above embodiments, the system may further include the feed gas channel being connected to each of the plurality of vessels via a manifold comprising at least two valves in a parallel flow arrangement; and a control system configured to open the at least two feed valves sequentially.

In another aspect, embodiments disclosed herein relate to a method of operating a pressure swing adsorption system comprising a plurality of vessels, a feed gas channel connected to the plurality of vessels, a product recovery channel connected to the plurality of vessels, a purge gas channel connected to the plurality of vessels, and a waste gas channel connected to the plurality of vessels, the method comprising at least one of: sequentially opening two or more valves disposed in a parallel flow arrangement and connecting one of the plurality of vessels to the product recovery channel; sequentially opening two or more valves disposed in a parallel flow arrangement and connecting one of the plurality of vessels to the waste gas channel; sequentially opening two or more valves disposed in a parallel flow arrangement and connecting one of the plurality of vessels to the equalization channel; sequentially opening two or more valves disposed in a parallel flow arrangement and connecting one of the plurality of vessels to the feed gas channel; and sequentially opening two or more valves disposed in a parallel flow arrangement and connecting one of the plurality of vessels to the purge gas channel.

Other aspects and advantages will be apparent from the following description and the appended claims.

BRIEF DESCRIPTION OF DRAWINGS

Figure 9B:
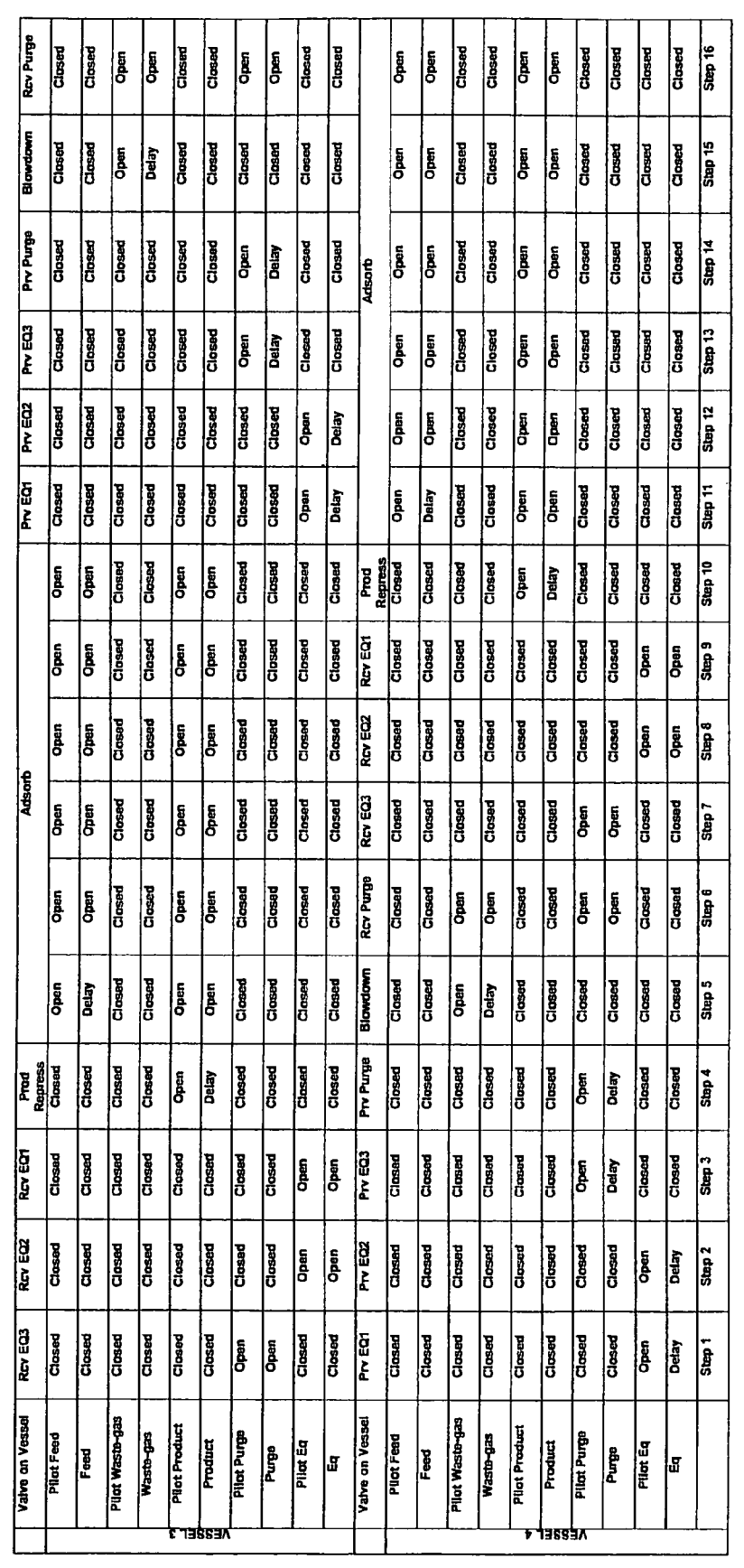

FIGS. 9A-9D are an example valve sequence chart for an 8 vessel pressure swing adsorption system as illustrated in FIG. 8 using 3 equalization stages.

Figure 11A:
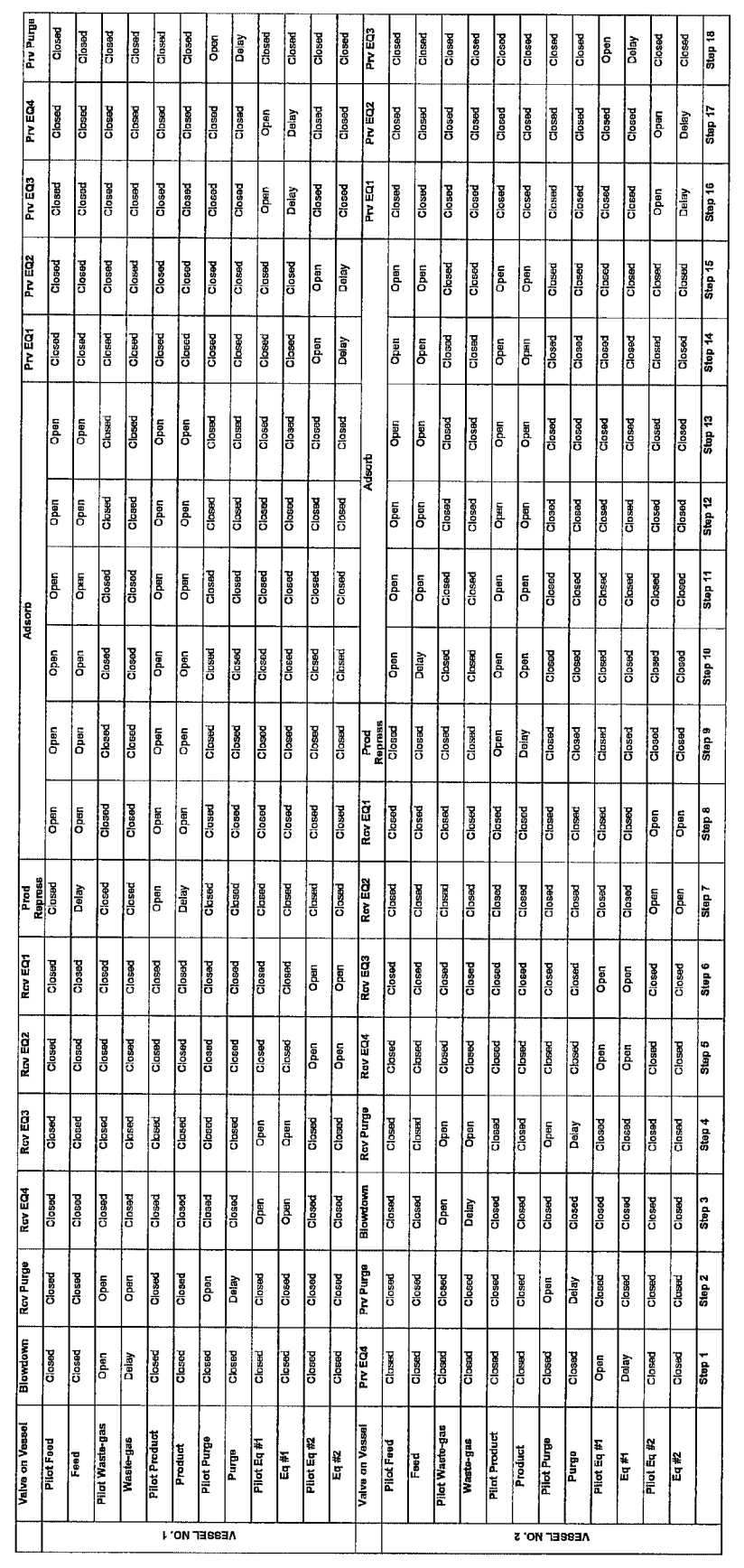
Figure 11B:
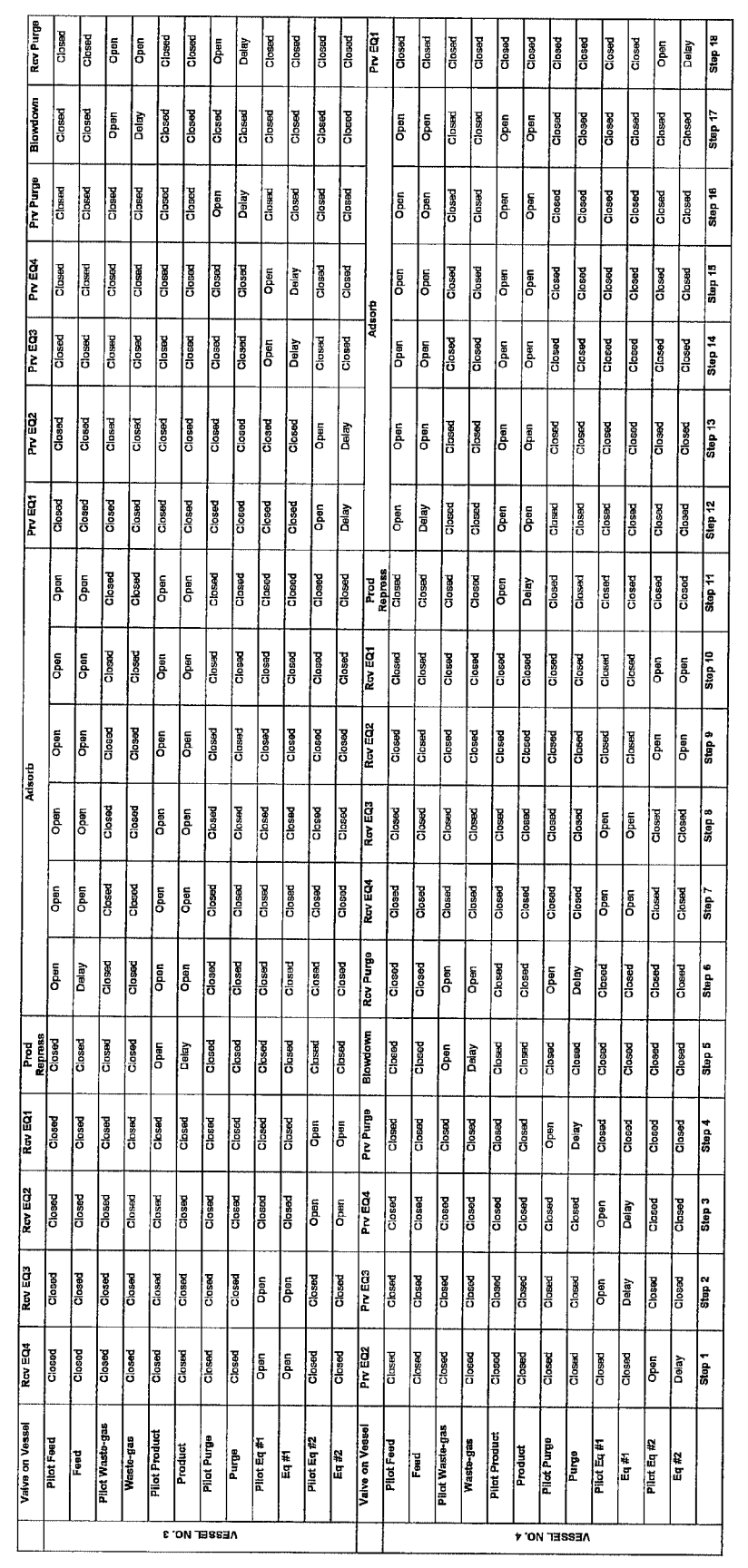
Figure 11D:
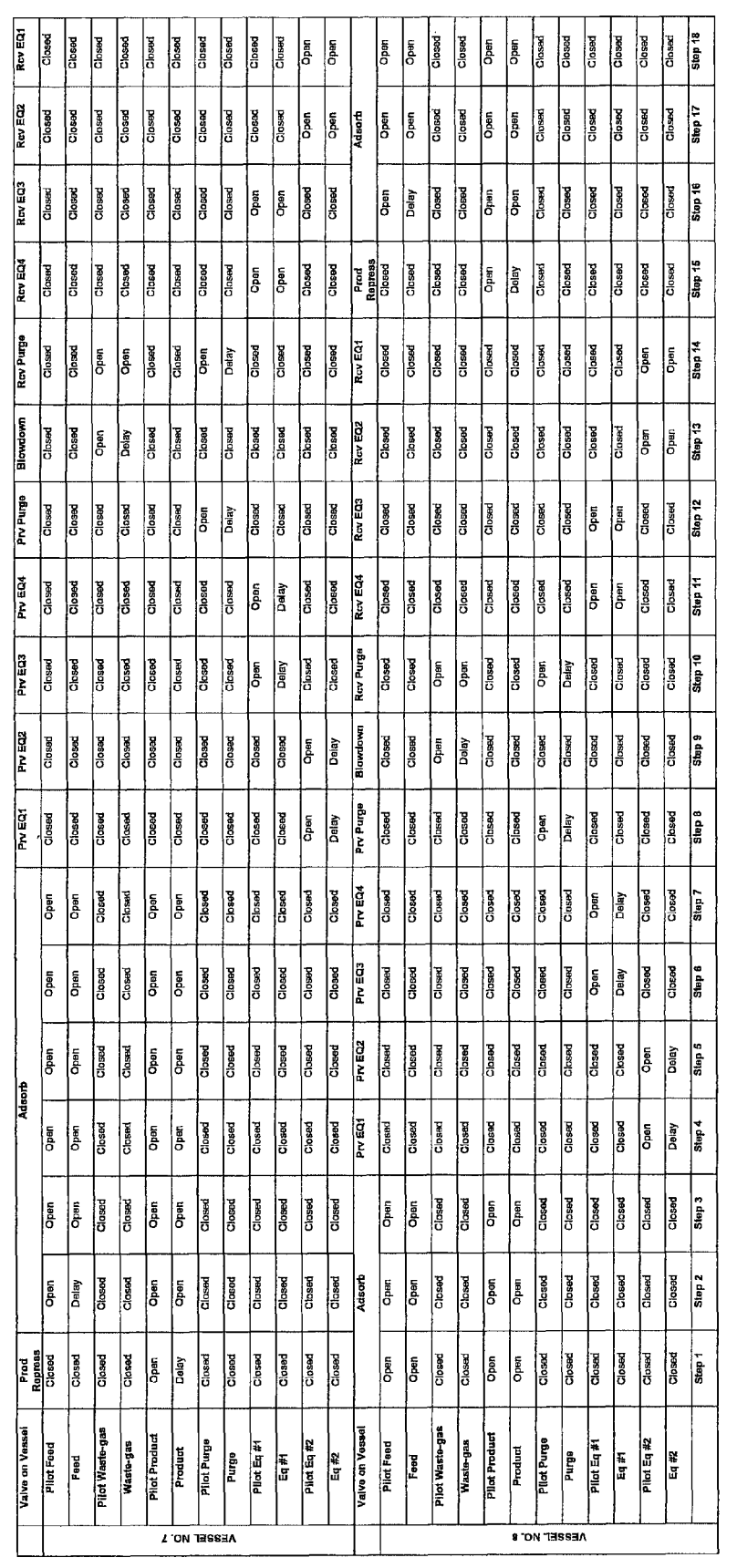

FIGS. 11A-11E are an example valve sequence chart for a 9 vessel pressure swing adsorption system as illustrated in FIG. 10 using 4 equalization stages.

DETAILED DESCRIPTION

In one aspect, embodiments disclosed herein relate to methods and apparatus for controlling the flow of gases entering or exiting a bed of adsorbent. More specifically, embodiments disclosed herein relate to the use of two or more valves for controlling the flow of gases entering or exiting a bed of adsorbents, where the two valves are opened sequentially (i.e., in at least two actions separated by a delay in time).

Figure 1:
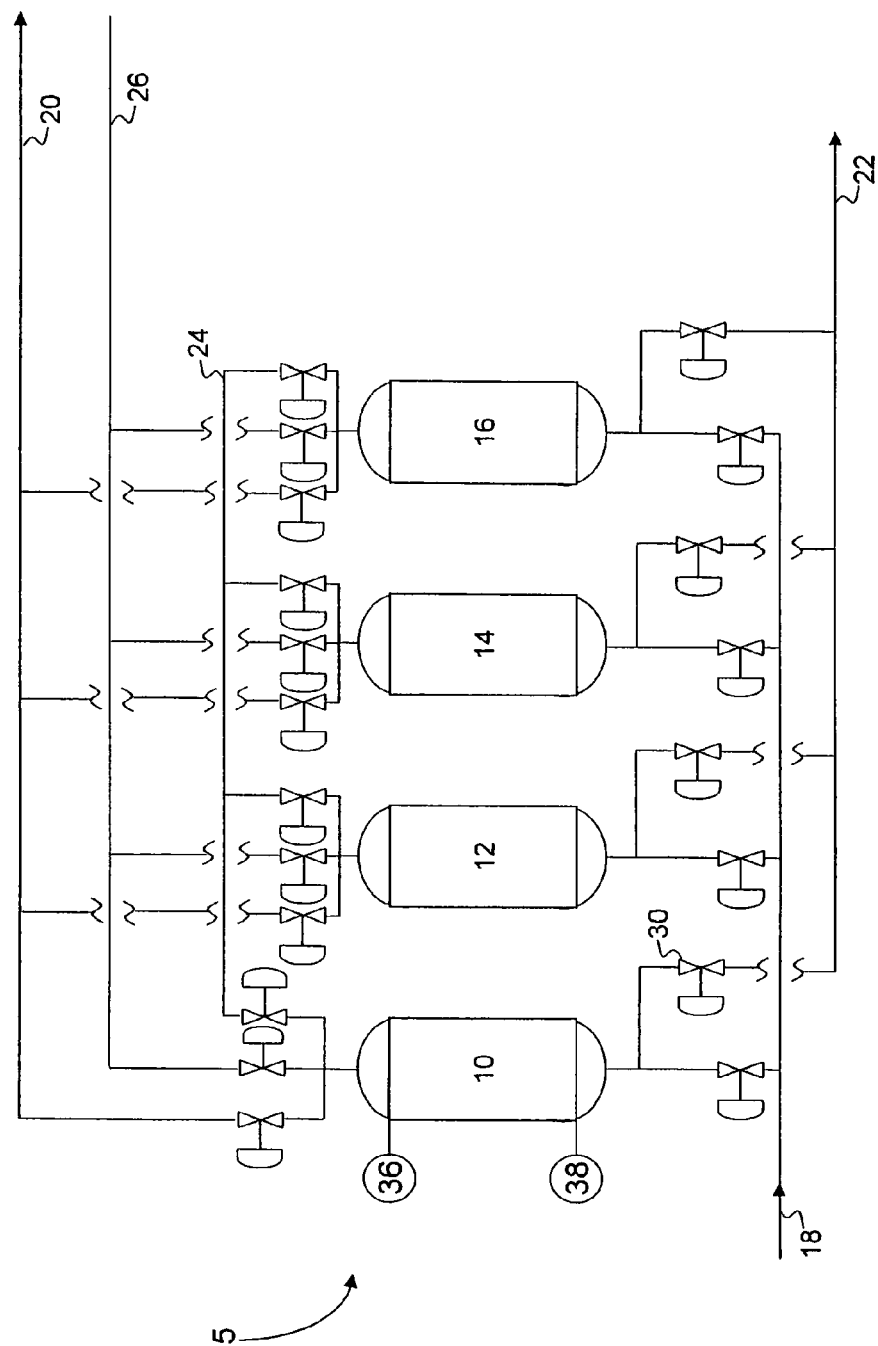
FIG. 1 is a simplified flow diagram of a prior art pressure swing adsorption system.

Referring now to FIG. 1, a simplified process flow diagram of a prior art PSA system is illustrated. The PSA system 5 includes a first vessel 10, a second vessel 12, a third vessel 14, and a fourth vessel 16. Each of the vessels 10, 12, 14, 16 typically includes one or more beds of adsorbent material. The vessels 10, 12, 14, 16 are connected in parallel flow relation between a source manifold 18, which supplies a feed gas mixture, and a product manifold 20, which provide an outlet for unabsorbed product effluent gas. The vessels 10, 12, 14, 16 are also connected to a waste manifold 22, which provides an outlet for adsorbed components. Additionally, the vessels 10, 12, 14, 16 are connected to an equalization manifold 24, providing for equalization of pressure between two or more vessels to conserve pressure energy during operation of the system. These are four manifolds typically discussed in the art, such as in U.S. Pat. No. 6,858,065. U.S. Pat. No. 7,674,319 also discloses connecting vessels 10, 12, 14, 16 to a purge gas manifold 26.

Figure 1A:
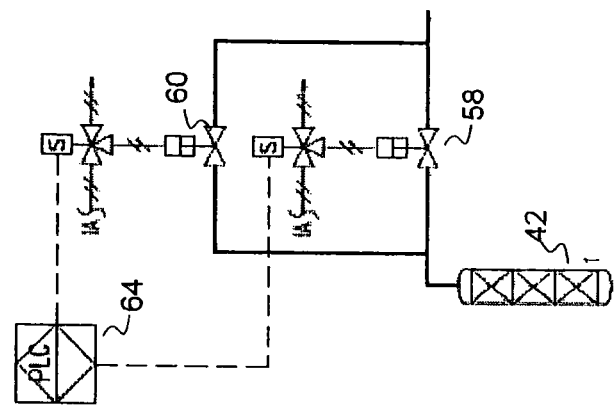
FIG. 1A is a simplified diagram of a control scheme used to operate a prior art pressure swing adsorption system.

Each of the vessels 10, 12, 14, 16 may be connected to the respective manifolds with a valve to control the flow of gas to and from the vessels. In the system of FIG. 1, the flow of gases to and from the adsorbent bed may be controlled, for example, using a system as illustrated in FIG. 1A. Vessel 10, for example, may be connected to a flow control valve 30, provided with position control and reporting assemblies (positioners) 32, used in conjunction with a control system 34 and at least two pressure sensors 36, 38 monitoring pressure in vessel 10 to attain targeted difference in pressure and/or rate of pressure decay. The flow rate through flow control valve 30 is continuously varied, and requires a complex control algorithm for tuning of the valve performance. Additionally, there is an inherent lack of reliability in the positioner itself. This results in such systems generally being provided with a manual override mode of operation. Further, such a system cannot be operated if either pressure sensor 36, 38 fails. This defect necessitates either provision of multiple sensors or of means to isolate the failed adsorbed vessel for repair of the defective components. Mal-operation of the control valve 30 can result in excessively rapid flow out of the vessel 10, which can result in the aerodynamic fluidization of the individual particles in the one or more adsorbent beds contained in this vessel, which can cause these particles to be carried out of the vessel, to break up due to impact with the vessel or other particles, or to be re-arranged in a non-uniform manner, thus potentially exacerbating the tendency of the particles to subsequently fluidize. If the control valve 30 provides insufficient flow, then the time required to complete the step in the PSA cycle will take longer to complete. If the PSA cycle is being operated at a fixed cycle frequency, this will result in a greater proportion of the desired product gas being disposed of as waste, thus reducing fractional recovery and adsorbent productivity. If the cycle frequency is reduced to compensate for the low flowrate, then the adsorbent productivity is reduced.

It has been surprisingly found that a PSA system may be improved by using two or more on/off valves in parallel to control the rate at which gas flows during feed, pressure equalization, product pressurization, counter-current blowdown, and/or purge. The use of on/off valves in parallel has also been found to allow a PSA system to operate with a reduction in the reliance on sensors and feedback control loops, both of which are inherently unreliable.

As an example, increasing the fractional recovery of the desired, less-adsorbing (light) species requires more efficient elimination of the adsorbed species (heavy) from the adsorbent bed at the end of each cycle. This can be achieved by controlling the rate at which pressure changes across the adsorbent bed during the countercurrent blowdown step while not restricting the flowrate from the same vessel to the same waste gas header during the subsequent purge step.

Figure 2:
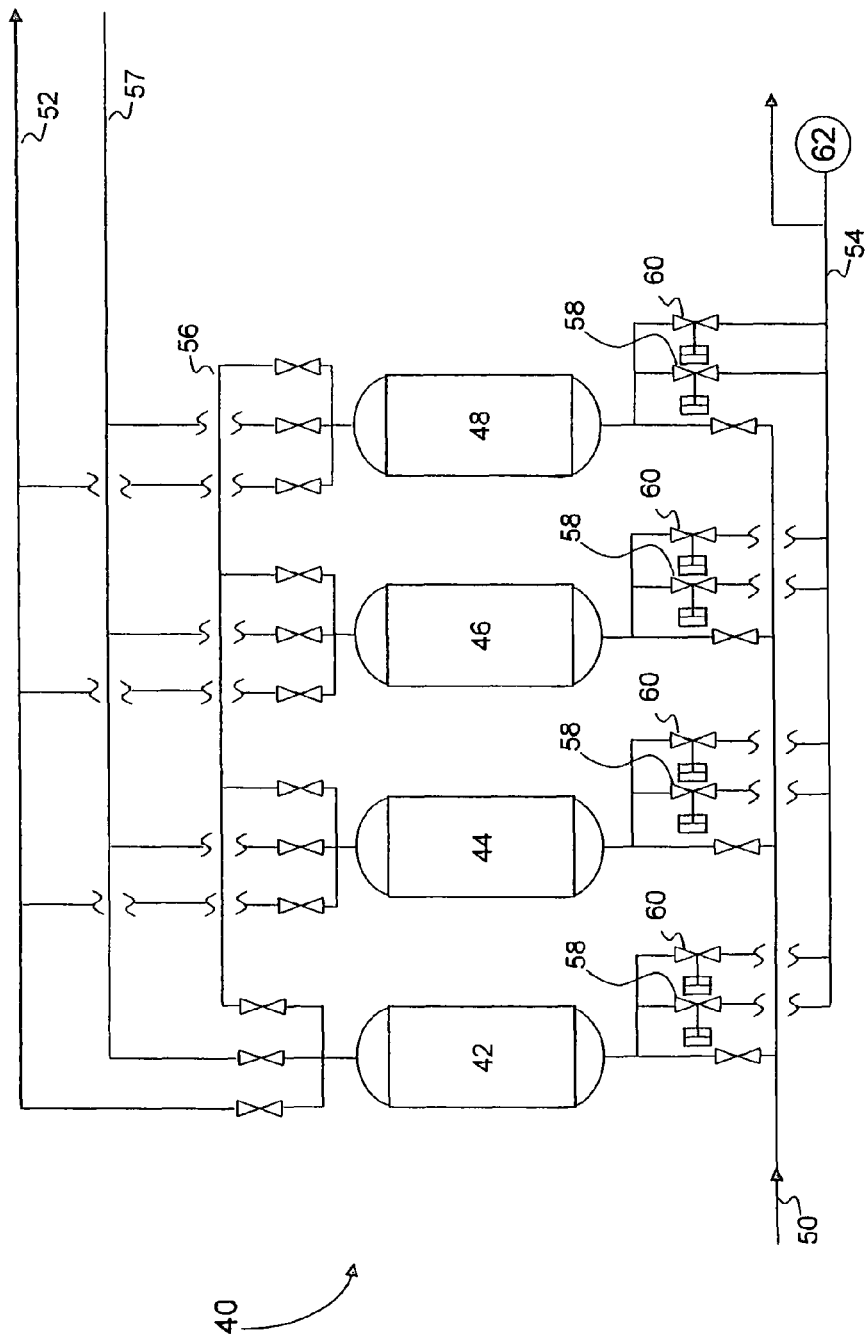
FIG. 2 is a simplified flow diagram of a pressure swing adsorption system according to embodiments disclosed herein.

Referring now to FIG. 2, one embodiment of a PSA system according to embodiments disclosed herein is illustrated, using two or more on/off valves for controlling the flow of gases exiting the adsorbent bed to the waste gas channel. PSA system 40 includes a first vessel 42, a second vessel 44, a third vessel 46, and a fourth vessel 48. Each of the vessels 42, 44, 46, 48 typically includes one or more beds of adsorbent material (not shown). The vessels 42, 44, 46, 48 are connected in parallel flow relation between a feed gas channel 50, which supplies a feed gas mixture, and a product recovery channel 52, which provide an outlet for unabsorbed product effluent gas. The vessels 42, 44, 46, 48 are also connected to a waste gas channel 54, which provides an outlet for adsorbed components. Additionally, the vessels 42, 44, 46, 48 are connected to an equalization channel 56, providing for equalization of pressure between two or more vessels to conserve pressure energy during operation of the system, and a purge gas channel 57, supplying a purge gas to the PSA system.

To achieve improved elimination of adsorbed species from the adsorbent bed during the depressurization step, each vessel 42, 44, 46, 48 may be respectively connected to the waste gas channel via parallel on/off valves 58, 60. While only two valves are shown, three or more valves may also be used. On/off valves 58, 60 may include a flow orifice of the same or different effective diameter, where the flow orifice diameters may be selected to tailor the rate at which pressure changes during the depressurization cycle.

Figure 7:
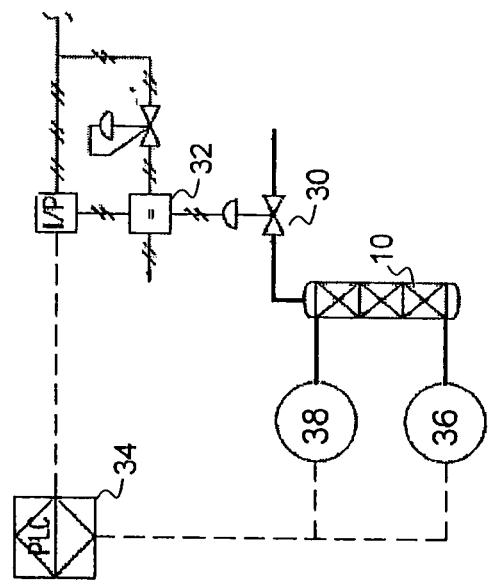
FIG. 7 is a simplified diagram of a control scheme used to operate a pressure swing adsorption system according to embodiment disclosed herein.

Referring now to FIGS. 2 and 7, in operation, the depressurization cycle may be controlled and monitored using a control system 64, and may begin by opening valve 58, providing for a first depressurization flow path, followed by the opening of valve 60 after a selected time interval, providing an increase in the size of the flow path during continued depressurization. As one skilled in the art would appreciate, use of n on/off valves, each of different size, may provide for $2^n$ distinct flow resistances. Selection of the size of the respective flow orifices may be tailored to meet the specific separation process and the desired pressure changes during the depressurization cycle, and may allow for elimination of the adsorbed species to be optimized. In one embodiment of the present invention, the final flow capacity of the combined valves used during the purge step is sufficient that the pressure loss through those valves is less than 2 psi. In another embodiment of the present invention, the valves 58 and 60 are chosen such that by first opening the valve 58 to begin the countercurrent blowdown of the vessel 42 then, after a predetermined time period, which is less than the duration of the countercurrent blowdown step, opening valve 60, the countercurrent blowdown can be substantially completed before the beginning of the subsequent purge step. In one embodiment of the present invention, substantial completion would be deemed to occur when the pressure within the vessel 42 is less than 5 psi greater than the pressure in waste header 54.

It has also been found by the present inventors that on/off valves may improve the reliability of the PSA system as compared to the typical flow control valves, such as illustrated in FIG. 1A. The PSA system of FIG. 1 and FIG. 1A, as mentioned above, requires tuning of the flow valve control and positioning of the valve trim. The control algorithm is complex, may be changed by operators randomly using a digital control system, and requires significant time from startup to achieve the desired control. Further, the variability in valve performance means that the control parameters used for a valve 30 on vessel 10 may not be suitable for a valve 30 on vessel 12, 14, or 16. This may be due to differences in response times (control lag times, differences in pressure regulator settings and performance, etc.), trim position, and trim size, and other factors. Further, changes in the positioner, the valve itself (i.e. due to erosion, fouling by particles, etc.), or the adsorbent bed (due to settling, plugging, and bulk or local fluidization over time may affect the performance of the valve and the associated feedback control algorithm in controlling flowrate into or out of the vessel The on/off valves used in the present invention do not require a control algorithm to provide for varying degrees of flow resistance. Rather, the sequential opening of the two or more on/off valves results in a desired change in the flow resistance. The change in flow resistance is predictable (open or closed) with on/off valves. It has also been found that the length of time to complete a cycle may be decreased with use of two or more on/off valves as compared to a single throttled flow control valve. Further, the on/off valves are significantly more robust than typical flow control valves, are typically less costly to purchase and maintain, and may operate over more cycles before valve failure.

The sequential opening of the on/off valves, as noted above, may be used to create more than one step change in either pressure itself, rate of pressure change, or the rate of change in the rate of pressure change. This may result in multiple benefits, including one or more of: improved elimination of adsorbed species during depressurization, reduced depressurization cycle time, reduction in the number of pressure sensors required, and less PSA system down time due to increased system reliability using on/off valves.

While more robust and reliable, as noted above, even on/off valves fail. Still referring to FIG. 2, to determine valve failure, a pressure sensor may be located on a vessel 42, 44, 46, 48, may be located on the waste gas channel, or may be located in a buffer tank connected to the waste gas channel. As illustrated in FIG. 2, a pressure sensor 62 is located on the waste gas channel. A single pressure sensor in any of these locations may provide for indirect measurement of valve opening by measuring the step change in pressure, rate of pressure change, or the rate of change in the rate of pressure change. Where the expected change, rate of change, or derivate of change in pressure does not occur, valve failure may be indicated.

In some embodiments, redundant valves (not shown) may connect a vessel to the waste gas channel. In the event that a valve 58, 60 fails, the control system 64 would recognize that the expected the step change in pressure, for example, did not occur, and a complementary algorithm may open one of the redundant valves in order to perform the intended pressure reduction with only a modest delay in action.

While a majority of the prior art described in the Background above was devoted to reducing the total number of valves, it has been found that although the present invention employs more discrete process valves than the traditional solution of a large single valve (positioned continuously to provide varying degrees of flow resistance), the present PSA systems uses few sensors and little or no feedback action, resulting in an overall more reliable system. Such a system may, in fact, have the same or fewer components due to the reduced need for sensors and actuators to provide for system control. Further, a deviation from intended actuation is easier to rectify automatically than use of a flow control valve, which typically requires manual intervention.

The use of at least two valves according to embodiments disclosed herein may also provide an advantage relative to the use of a single proportioning flow control valve in that proportioning valves have a reduced rate of opening and closing as compared to on/off valves. This reduced rate causes the possibility of either excessively-extended step time in the PSA cycle to accommodate the valve closing, which is otherwise desirably very rapid, or the provision of an additional actuated valve to provide rapid exhausting. This additional valve adds an additional component which may cause failure. When at least two on/off valves are used in place of a proportioning valve, each of these valves may provide rapid and positive actuation.

A further advantage of using two or more valves which are opened sequentially in a PSA system is that inevitably, the pressure difference between the vessel and the source or destination of the flowing gas decreases between the first time when the first of the two or more valves open and a second time when further valves are opened. For most types of process valves, the torque and/or force of the actuator is a function of the differential pressure. Thus, though the first valve must be provided with an actuator sufficient to open the valve against the maximum pressure differential, the other valves may be provided with a smaller actuator. This advantageously reduces the size and weight of the actuator, but also reduces the fatigue stress to which the valve is subjected, advantageously reducing the risk of eventual fatigue failure of the valve in service. A related advantage of the provision of a smaller actuator is that inadvertent operation of the valve can be prevented when the differential pressure is undesirably high. In one embodiment of the present invention, the vessels 42, 44, 46, 48 in FIG. 2 are provided with a valve 58 having a relatively small flow capacity and capable of opening at a first pressure differential. The valve 60 is provided with a second, larger flow capacity, but is provided with a relatively weaker actuator which can only open the valve at a differential pressure appropriate to the intended time of opening. This embodiment prevents unintended opening of the large valve 60 while the vessel 42 is at high pressure, thus preventing an unintended high flowrate to the waste header 54, which could cause serious operational problems. Further, if the opening pressure differential of the valve 60 is chosen carefully, the opening of this valve would self-compensate for variations in the flowrate through valve 58, as even though the digital signal to open the valve (often pneumatic) is activated, the valve will not, in fact, open until the desired differential pressure is achieved.

The improved performance realized with the use of two or more on/off valves connecting the vessels to the waste gas channel may also be realized using two or more on/off valves for performing other steps in the cycle. Accordingly, it may be desired to connect one or more of the feed gas channel, the purge gas channel, the product gas channel, and the equalization channel to the vessels with a valve manifold comprising two or more on/off valves in a parallel flow arrangement. The control system may also be configured to open such valves, when present, sequentially.

Figure 3:
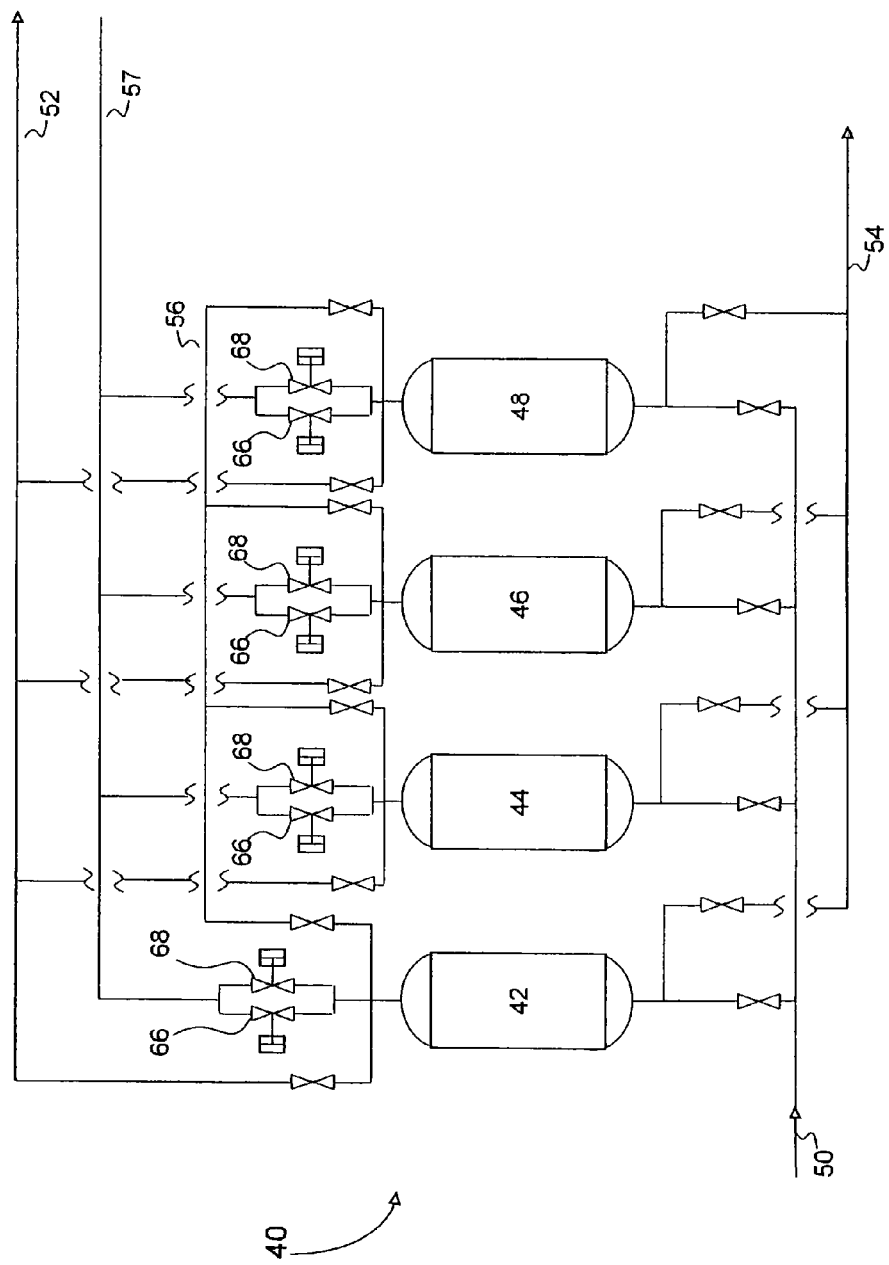
FIG. 3 is a simplified flow diagram of a pressure swing adsorption system according to embodiments disclosed herein.

Referring now to FIG. 3, where like numerals represent like parts, one embodiment of a PSA system according to embodiments disclosed herein is illustrated, using two or more valves for controlling the flow of gases to or from the adsorbent bed through the purge gas channel. This purge channel may be configured to perform only the purge step, or may be configured to sequentially perform several steps. Likewise, though FIG. 3 depicts a PSA having four vessels, the present invention can be applied to PSA systems having any number of vessels 2 or greater. In the embodiment of FIG. 3, the purge gas channel 57 is connected to each of the vessels 42, 44, 46, 48 via a valve manifold including at least two on/off valves 66, 68 in a parallel flow arrangement. Similar to the embodiment of FIG. 2, a pressure sensor (not illustrated) may be located on any one of the vessels 42, 44, 46, 48, the purge gas channel 57, or on a buffer tank fluidly connected to the purge gas channel.

Figure 4:
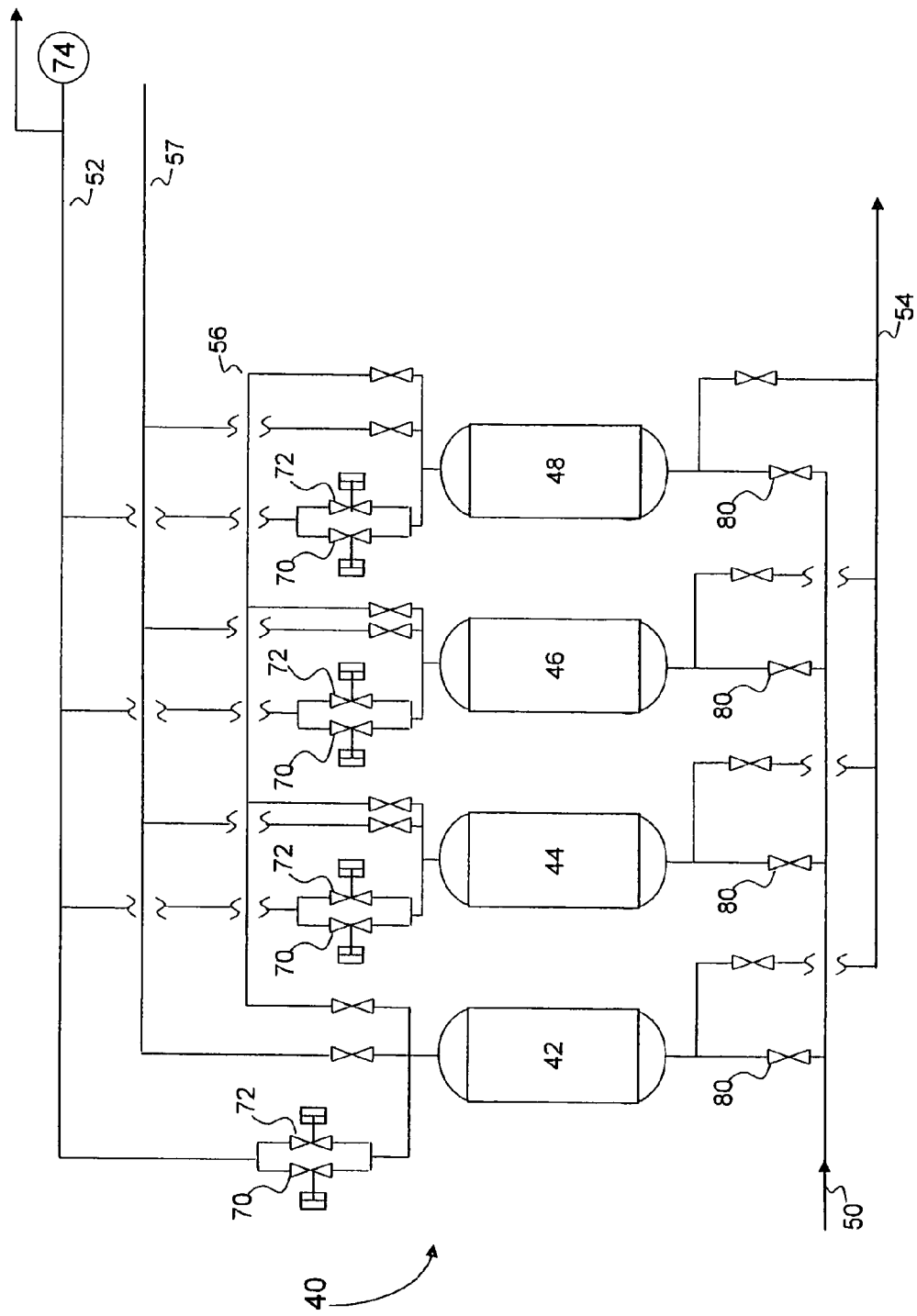
FIG. 4 is a simplified flow diagram of a pressure swing adsorption system according to embodiments disclosed herein.

Referring now to FIG. 4, where like numerals represent like parts, one embodiment of a PSA system according to embodiments disclosed herein is illustrated, using two or more valves for controlling the flow of gases entering or exiting the adsorbent bed to the product recovery channel. In this embodiment, the product recovery channel 52 is connected to each of the vessels 42, 44, 46, 48 via a valve manifold including at least two on/off valves 70, 72 in a parallel flow arrangement. Similar to the embodiment of FIG. 2, a pressure sensor 74 may be located on any one of the vessels 42, 44, 46, 48, the product recovery channel 52 (as illustrated), or on a buffer tank (not illustrated) fluidly connected to the product recovery channel 52.

The operation of the embodiment of FIG. 4 differs somewhat from the previous embodiments in that the flow being controlled is into the vessel 42 from the product header 52. At the beginning of the final pressurization step after the last of the one or more pressure equalization steps, the final pressurization can be achieved by using purified product gas, unpurified feed gas, or both of these. By having a first valve 70 which has a first flow capacity open at the beginning of the final pressurization step, a first flowrate of product gas into vessel 42 is achieved. In one embodiment of the present invention, the flow restriction of valve 70 can be selected so that the flowrate through valve 70 causes a deviation in net product flow out of the PSA 40 which is less than a target value, say 15%. After a first time interval, feed valve 80 could be opened to effect a partial product repressurization. After a second time interval, the valve 72 can be opened. Alternatively, the at least two valves can be provided at the position of the feed valve 80, instead of the position of the product valves 70 and 72, or two or more valves can be provided at each of the positions. In an embodiment where two valves are provided at one position and only one valve is provided at the other, five distinct states exist for flow between the headers. No flow from either direction. Flow in only from the feed header 50, flow in only from the product header 52, and two combinations of flow resistance across the vessel and through the combination of the open valves. These combinations can permit tailoring the rate of flowrate between the headers to execute the final repressurization without disadvantageous fluidization of the adsorbent bed, and can advantageously subsequently permit production of purified product during what would otherwise nominally constitute the final pressurization step. This advantageously increases the fraction of the PSA cycle during which adsorption separation is occurring, and increases adsorbent productivity.

Figure 5:
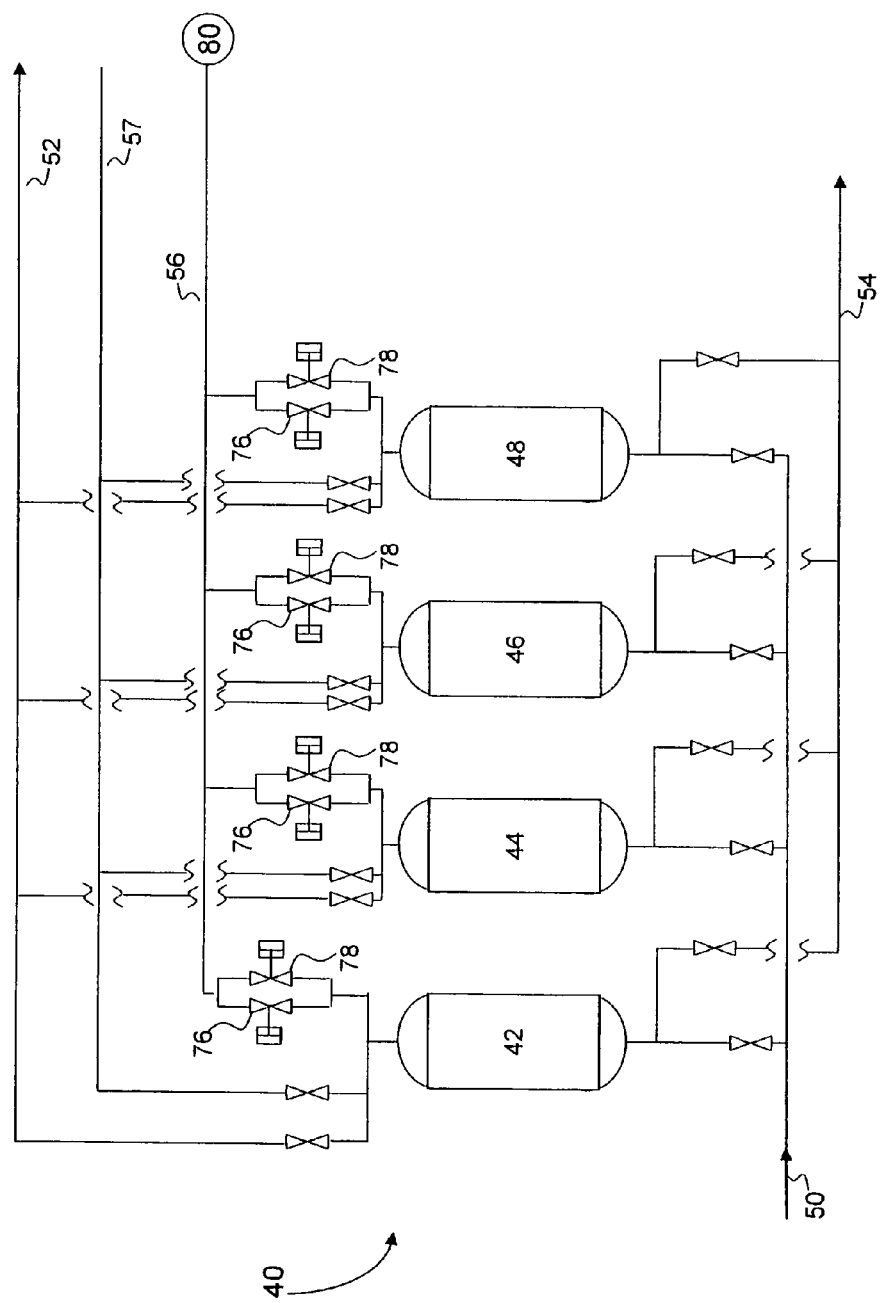
FIG. 5 is a simplified flow diagram of a pressure swing adsorption system according to embodiments disclosed herein.

Referring now to FIG. 5, where like numerals represent like parts, one embodiment of a PSA system according to embodiments disclosed herein is illustrated, using two or more valves for controlling the flow of gases exiting the adsorbent bed to the equalization channel. In this embodiment, the equalization channel 56 is connected to each of the vessels 42, 44, 46, 48 via a valve manifold including at least two on/off valves 76, 78 in a parallel flow arrangement. Similar to the embodiment of FIG. 2, a pressure sensor 80 may be located on any one of the vessels 42, 44, 46, 48, the equalization channel 56 (as illustrated), or on a buffer tank (not illustrated) fluidly connected to the equalization channel 56. As before, the equalization channel need not be used only for equalization, and can be of the type known in the art, where the same channel is used to execute at least two sequential steps, such as a first and a second equalization step.

Figure 6:
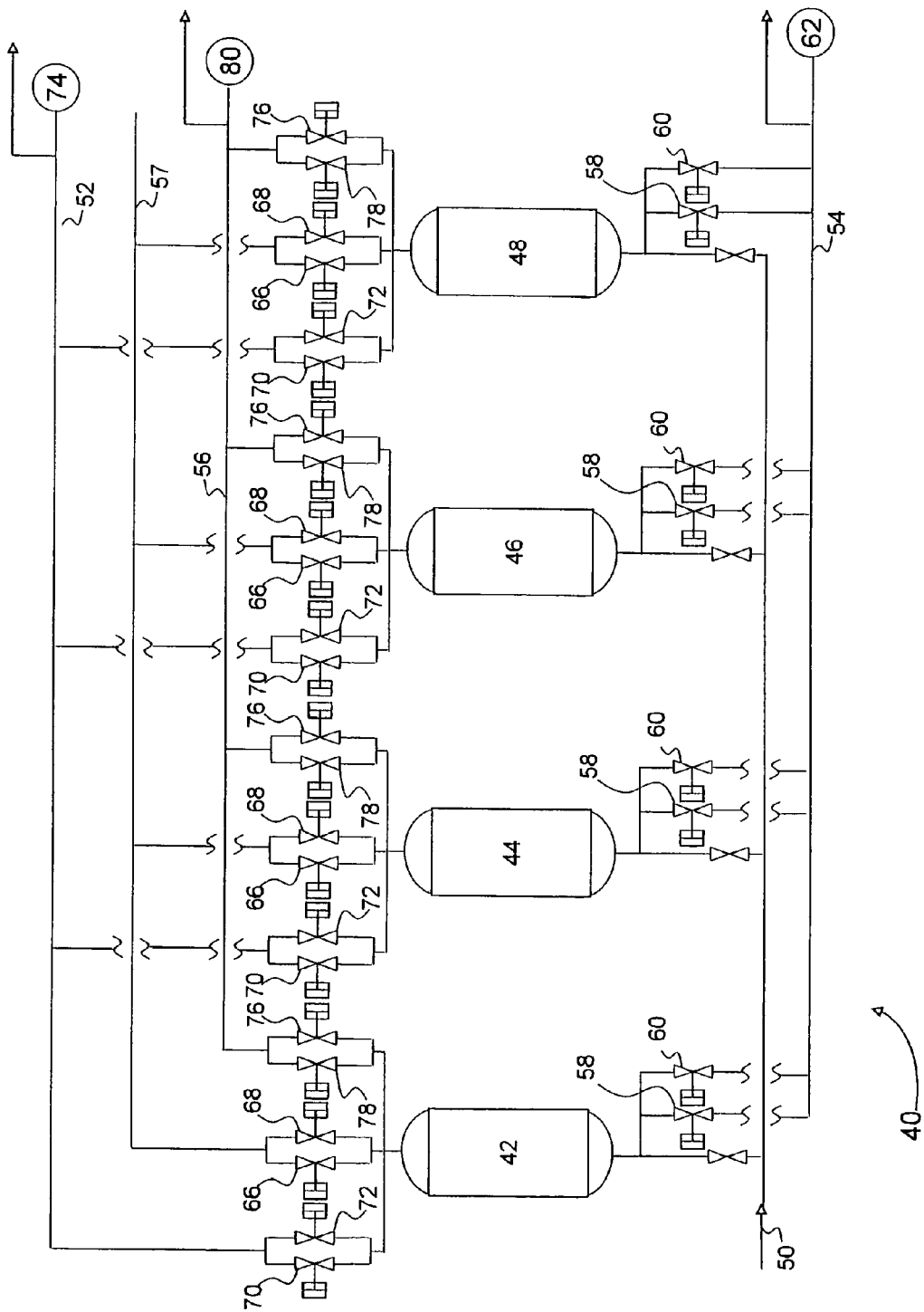
FIG. 6 is a simplified flow diagram of a pressure swing adsorption system according to embodiments disclosed herein.
Figure 10:
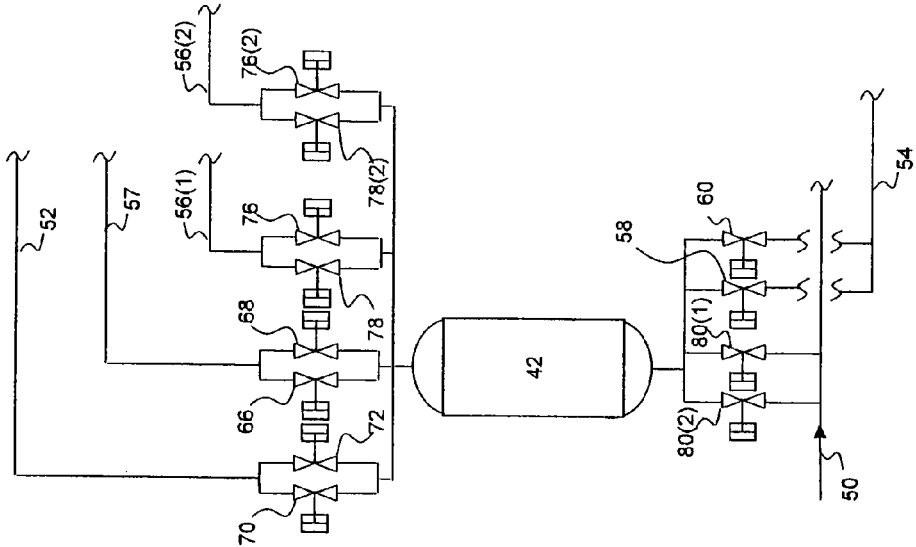
FIG. 10 is a simplified flow diagram of a pressure swing adsorption system according to embodiments disclosed herein.
Figure 8:
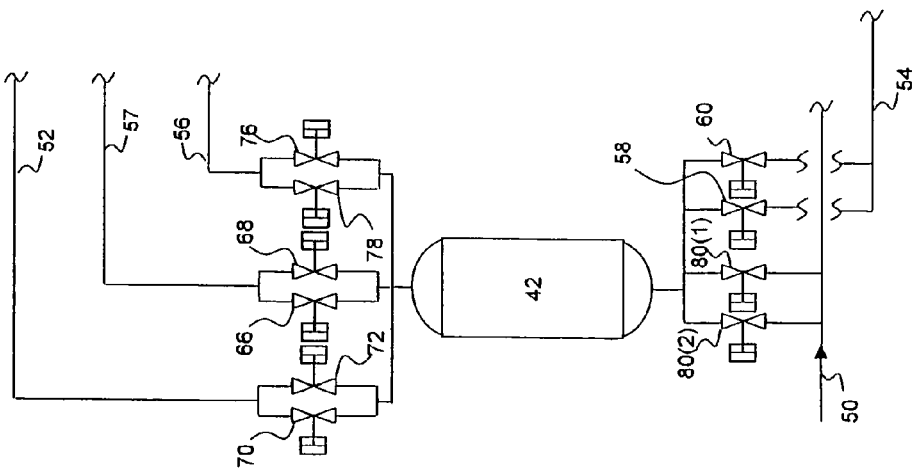
FIG. 8 is a simplified flow diagram of a pressure swing adsorption system according to embodiments disclosed herein.

Referring now to FIG. 6, where like numerals represent like parts, one embodiment of a PSA system according to embodiments disclosed herein is illustrated, using two or more valves for controlling the flow of gases flowing to or from the adsorbent bed to each of the product recovery channel, the purge channel, the waste gas channel, and the equalization channel.

Cyclic adsorption processes, as mentioned above, use several steps to achieve the desired separation, including adsorption, equalization, and depressurization, among others. These steps may be performed upflow or downflow, depending upon the vessel and piping configuration used. For example, as illustrated in FIG. 5, the PSA system 40 includes an equalization channel 56 disposed above the vessels 42, 44, 46, 48. The cyclic adsorption process may recover pressure energy by equalizing the pressure between one vessel at a higher initial pressure with another vessel at a lower initial pressure to achieve a final, intermediate pressure. A vessel that performs the pressure equalization in an upflow direction has the potential to fluidize and dust downstream valves and piping if the velocity is not carefully controlled. Thus, care must be used when selecting the amplitude of the flow restriction for the two or more valves 76, 78. To limit the potential for fluidization when pressure equalization begins, where the pressure differential and hence velocities are greatest, a first valve 76 with a limited flow area may open first, limiting the maximum velocity achievable to a fraction of the velocity required to fluidize the upflowing vessel. At a later point in the pressure equalization step, a second valve 78 is opened while the first valve 76 remains open, to increase the total area for flow and to ensure the intermediate pressure is achieved in the desired period of time. The interval at which the second valve 78 opens may be programmed, for example, to occur at a point where the pressure differential between the vessels is smaller and the resulting velocity in the upflowing vessel will not fluidize the adsorbent. For greater velocity control, this concept can be extended to a plurality (three or more) of valves that are programmed to open at different intervals during pressure equalization to achieve the desired velocity profile in the upflowing vessel.

While only four vessels are shown in FIGS. 2-6, PSA systems according to embodiments herein may include any number of vessels, such as 2, 3, 4, 5, 6, 7, 8, 9, or more vessels. Single vessel PSA may also benefit from embodiments herein, although a pressure equalization channel may not be necessary.

Referring now to FIGS. 8 and 9A-9D, where like numerals represent like parts, a valve sequence for a PSA system according to embodiments disclosed herein is illustrated. The PSA system of FIGS. 8 and 9A-9D includes 8 vessels with the valve configuration shown in FIG. 8, including two parallel on/off valves connecting the vessel to each of the feed gas channel 50, the product recovery channel 52, the waste gas channel 54, the equalization channel 56, and the purge gas channel 57. Although only one vessel is illustrated, it is appreciated that the 8 vessels of the system are connected similar to the embodiments illustrated in FIGS. 2-6.

The valve sequence illustrated in FIGS. 9A-9D use 3 equalization steps in the PSA cycle, which includes: adsorption ("Adsorb"), where the vessel is at high pressure and preferably making enriched product gas; "Pry EQ1," "Pry EQ2," and Pry EQ3," where the vessel provides gas for a pressure equalization stage; blowdown ("blowdown"), denoting depressurization to the lowest pressure of the system; "Rcv EQ1," "Rcv EQ2," and "Rcv EQ3," where the vessel receives gas during a pressure equalization stage; product repressurization ("Prod Repress"); and "Pry Purge" and "Rcv Purge" where purge gas is fed from or to the vessel, respectively.

The two valves connecting the vessel to each channel are differentiated in FIGS. 9A-9D by indicating one as the "pilot," which is typically the first valve to open during initiation of a stage, the "pilot" valve having a smaller flow orifice to control initial flow from the vessels as described above. For example, valve 58 in FIG. 8 may be the pilot valve connecting the vessel to the waste gas channel 54, and valve 60 may be the second valve connecting the vessel to the waste gas channel 54. The sequential opening of the second valve is indicated in FIGS. 9A-9D by "delay," where the time delay between opening of the pilot valve and the second valve is appropriate for the stage of the PSA cycle. The valve sequence illustrated in FIGS. 9A-9D uses 3 equalization steps in the PSA cycle, which includes: Adsorption ("adsorb"), where the vessel is at high pressure and preferably making enriched product gas; "Pry EQ1," "Pry EQ2," and "Pry EQ3," where the vessel provides gas for a pressure equalization stage; blowdown ("blowdown"), denoting depressurization to the lowest pressure of the system; "Rcv EQ1," "Rcv EQ2," and "Rcv EQ3," where the vessel receives gas during a pressure equalization stage; product repressurization ("Prod Repress"); and "Pry Purge" and "Rcv Purge" where purge gas is fed from or to the vessel, respectively.

Referring now to FIGS. 10 and 11A-11E, where like numerals represent like parts, a valve sequence for a PSA system according to embodiments disclosed herein is illustrated. The PSA system of FIGS. 10 and 11A-11E includes 9 vessels with the valve configuration shown in FIG. 10, including two parallel on/off valves connecting the vessel to each of the feed gas channel 50, the product recovery channel 52, the waste gas channel 54, a first equalization channel 56(1), a second equalization channel 56(2), and the purge gas channel 57. Although only one vessel is illustrated, it is appreciated that the 9 vessels of the system are connected similar to the embodiments illustrated in FIGS. 2-6.

The valve sequence illustrated in FIGS. 11A-11E uses 4 equalization steps in the PSA cycle, which includes: adsorption ("Adsorb"), where the vessel is at high pressure and preferably making enriched product gas; "Pry EQ1," "Pry EQ2," "Pry EQ3," and "Pry EQ4," where the vessel provides gas for a pressure equalization stage; blowdown ("blowdown"), denoting depressurization to the lowest pressure of the system; "Rcv EQ1," "Rcv EQ2," "Rcv EQ3," and "Rcv EQ4," where the vessel receives gas during a pressure equalization stage; product repressurization ("Prod Repress"); and "Pry Purge" and "Rcv Purge" where purge gas is fed from or to the vessel, respectively.

The two valves connecting the vessel to each channel are differentiated in FIGS. 11A-11E by indicating one as the "pilot," which is typically the first valve to open during initiation of a stage, the "pilot" valve having a smaller flow orifice to control initial flow from the vessels as described above. For example, valve 58 in FIG. 10 may be the pilot valve connecting the vessel to the waste gas channel 54, and valve 60 may be the second valve connecting the vessel to the waste gas channel 54. The sequential opening of the second valve is indicated in FIG. 9 by "delay," where the time delay between opening of the pilot valve and the second valve is appropriate for the stage of the PSA cycle. The valve sequence illustrated in FIG. 9 uses 3 equalization steps in the PSA cycle, which includes: Adsorption ("adsorb"), where the vessel is at high pressure and preferably making enriched product gas; "Pry EQ1," "Pry EQ2," and "Pry EQ3," where the vessel provides gas for a pressure equalization stage; blowdown ("blowdown"), denoting depressurization to the lowest pressure of the system; "Rcv EQ1," "Rcv EQ2," and "Rcv EQ3," where the vessel receives gas during a pressure equalization stage; product repressurization ("Prod Repress"); and "Pry Purge" and "Rcv Purge" where purge gas is fed from or to the vessel, respectively. FIGS. 11A-11E shows another example of the application of some aspects of the present invention, and differs from the example illustrated in FIG. 9 by the addition of a 4th pressure equalization, where an additional two time steps are included in the cycle in order to execute "Pry EQ4" and "Rcv EQ4," respectively.

As described above, PSA systems according to embodiments include two or more on/off valves in a parallel flow arrangement to provide for enhanced control of flow to or from adsorbent beds during the respective cycles. While using multiple valves for each step, total piece count for the PSA systems herein may be decreased or minimized by properly locating pressure sensors.

Advantageously, embodiments disclosed herein may provide for one or more of: enhanced process performance (higher fractional recovery of product gas); a reduction in the reliance on sensors and feedback control loops; equivalent or better technical performance with fewer parts, greater simplicity, as well as the potential for permitting a "self-healing" mode where the failure of a single valve or sensor does not interrupt the function of the PSA system.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

All documents cited herein, including testing procedures, are herein fully incorporated by reference, for all jurisdictions in which such incorporation is permitted, to the extent such disclosure is consistent with the description of the present invention.

What is claimed is:

1. A pressure swing adsorption system, comprising:
a plurality of vessels having one or more layers of adsorbent material therein;
a feed gas channel connected to the plurality of vessels;
a product recovery channel connected to the plurality of vessels;
a purge gas channel connected to the plurality of vessels;
a waste gas channel connected to the plurality of vessel; and
an equalization channel connected to the plurality of vessels;
the product recovery channel being connected to each of the plurality of vessels via a manifold comprising at least two valves in a parallel flow arrangement; and
a control system configured to open the at least two valves sequentially.

2. The system of claim 1, further comprising at least one of the following:
the purge gas channel being connected to each of the plurality of vessels via a manifold comprising at least two valves in a parallel flow arrangement;
the waste gas channel being connected to each of the plurality of vessels via a manifold comprising at least two valves in a parallel flow arrangement;
the equalization channel being connected to each of the plurality of vessels via a manifold comprising at least two valves in a parallel flow arrangement;
wherein, when the respective manifolds are present, the control system is configured to:
open the at least two valves in the manifold connecting the purge gas channel sequentially;
open the at least two valves in the manifold connecting the waste gas channel sequentially; and
open the at least two valves in the manifold connecting the equalization channel sequentially.

3. The system of claim 2, wherein each of the valves in the respective manifolds is an on/off valve.

4. The system of claim 3, wherein the on/off valves in each respective manifold has a flow orifice of a similar diameter.

5. The system of claim 3, wherein the on/off valves in each respective manifold has a flow orifice of different diameters.

6. The system of claim 5, further comprising at least one of:
a pressure sensor for measuring a pressure in each of the plurality of vessels;
a pressure sensor for measuring a pressure in the product recovery channel; and
a pressure sensor for measuring a pressure in a buffer vessel fluidly connected to the product recovery channel;
wherein the control system is configured to determine a valve failure based upon the pressure measured by at least one of, when present, the pressure sensor in each of the plurality of vessels, the pressure sensor in the product recovery channel, and the pressure sensor in the buffer vessel during the sequential opening of the at least two valves in the manifold connecting the product recovery channel.

7. The system of claim 6, further comprising at least one of:
a pressure sensor for measuring a pressure in each of the plurality of vessels;
a pressure sensor for measuring a pressure in the purge gas channel; and
a pressure sensor for measuring a pressure in a buffer vessel fluidly connected to the purge gas channel;
wherein the control system is configured to determine a valve failure based upon the pressure measured by at least one of, when present, the pressure sensor in each of the plurality of vessels, the pressure sensor in the purge gas channel, and the pressure sensor in the buffer vessel fluidly connected to the purge gas channel during the sequential opening of the at least two valves in the manifold connecting the purge gas channel.

8. The system of claim 7, further comprising at least one of:
a pressure sensor for measuring a pressure in each of the plurality of vessels;
a pressure sensor for measuring a pressure in the waste gas channel; and
a pressure sensor for measuring a pressure in a buffer vessel fluidly connected to the waste gas channel;
wherein the control system is configured to determine a valve failure based upon the pressure measured by at least one of, when present, the pressure sensor in each of the plurality of vessels, the pressure sensor in the waste gas channel, and the pressure sensor in the buffer vessel fluidly connected to the waste gas channel during the sequential opening of the at least two valves in the manifold connecting the waste gas channel.

9. The system of claim 8, further comprising at least one of:
a pressure sensor for measuring a pressure in each of the plurality of vessels;
a pressure sensor for measuring a pressure in the equalization channel; and
a pressure sensor for measuring a pressure in a buffer vessel fluidly connected to the equalization channel;
wherein the control system is configured to determine a valve failure based upon the pressure measured by at least one of, when present, the pressure sensor in each of the plurality of vessels, the pressure sensor in the equalization channel, and the pressure sensor in the buffer vessel fluidly connected to the equalization channel during the sequential opening of the at least two valves in the manifold connecting the equalization channel.

10. The system of claim 9, wherein one or more of the respective manifolds comprises at least three valves, and wherein the control system is configured to open the at least three valves sequentially.

11. A pressure swing adsorption system, comprising:
a plurality of vessels having one or more layers of adsorbent material therein;
a feed gas channel connected to the plurality of vessels;
a product recovery channel connected to the plurality of vessels;
a purge gas channel connected to the plurality of vessels;
a waste gas channel connected to the plurality of vessel; and
an equalization channel connected to the plurality of vessels;
the purge gas channel being connected to each of the plurality of vessels via a manifold comprising at least two valves in a parallel flow arrangement; and
a control system configured to open the at least two valves sequentially.

12. The system of claim 11, further comprising at least one of the following:
the product recovery channel being connected to each of the plurality of vessels via a manifold comprising at least two valves in a parallel flow arrangement;
the waste gas channel being connected to each of the plurality of vessels via a manifold comprising at least two valves in a parallel flow arrangement;
the equalization channel being connected to each of the plurality of vessels via a manifold comprising at least two valves in a parallel flow arrangement;
wherein, when the respective manifolds are present, the control system is configured to:
open the at least two valves in the manifold connecting the product recovery channel sequentially;
open the at least two valves in the manifold connecting the waste gas channel sequentially; and
open the at least two valves in the manifold connecting the equalization channel sequentially.

13. The system of claim 12, wherein each of the valves in the respective manifolds is an on/off valve.

14. The system of claim 13, wherein the on/off valves in each respective manifold has a flow orifice of a similar diameter.

15. The system of claim 13, wherein the on/off valves in each respective manifold has a flow orifice of different diameters.

16. The system of claim 15, further comprising at least one of:
a pressure sensor for measuring a pressure in each of the plurality of vessels;
a pressure sensor for measuring a pressure in the purge gas channel; and
a pressure sensor for measuring a pressure in a buffer vessel fluidly connected to the purge gas channel;
wherein the control system is configured to determine a valve failure based upon the pressure measured by at least one of, when present, the pressure sensor in each of the plurality of vessels, the pressure sensor in the purge gas channel, and the pressure sensor in the buffer vessel during the sequential opening of the at least two valves in the manifold connecting the purge gas channel.

17. The system of claim 16, further comprising at least one of:
a pressure sensor for measuring a pressure in each of the plurality of vessels;
a pressure sensor for measuring a pressure in the product recovery channel; and
a pressure sensor for measuring a pressure in a buffer vessel fluidly connected to the product recovery channel;
wherein the control system is configured to determine a valve failure based upon the pressure measured by at least one of, when present, the pressure sensor in each of the plurality of vessels, the pressure sensor in the product recovery channel, and the pressure sensor in the buffer vessel fluidly connected to the product recovery channel during the sequential opening of the at least two valves in the manifold connecting the product recovery channel.

18. The system of claim 17, further comprising at least one of:
a pressure sensor for measuring a pressure in each of the plurality of vessels;
a pressure sensor for measuring a pressure in the waste gas channel; and
a pressure sensor for measuring a pressure in a buffer vessel fluidly connected to the waste gas channel;
wherein the control system is configured to determine a valve failure based upon the pressure measured by at least one of, when present, the pressure sensor in each of the plurality of vessels, the pressure sensor in the waste gas channel, and the pressure sensor in the buffer vessel fluidly connected to the waste gas channel during the sequential opening of the at least two valves in the manifold connecting the waste gas channel.

19. The system of claim 18, further comprising at least one of:
a pressure sensor for measuring a pressure in each of the plurality of vessels;
a pressure sensor for measuring a pressure in the equalization channel; and
a pressure sensor for measuring a pressure in a buffer vessel fluidly connected to the equalization channel;
wherein the control system is configured to determine a valve failure based upon the pressure measured by at least one of, when present, the pressure sensor in each of the plurality of vessels, the pressure sensor in the equalization channel, and the pressure sensor in the buffer vessel fluidly connected to the equalization channel during the sequential opening of the at least two valves in the manifold connecting the equalization channel.

20. The system of claim 19, wherein one or more of the respective manifolds comprises at least three valves, and wherein the control system is configured to open the at least three valves sequentially.

21. A pressure swing adsorption system, comprising:
a plurality of vessels having one or more layers of adsorbent material therein;
a feed gas channel connected to the plurality of vessels;
a product recovery channel connected to the plurality of vessels;
a purge gas channel connected to the plurality of vessels;
a waste gas channel connected to the plurality of vessel; and
an equalization channel connected to the plurality of vessels;
the waste gas channel being connected to each of the plurality of vessels via a manifold comprising at least two valves in a parallel flow arrangement; and
a control system configured to open the at least two valves sequentially.

22. The system of claim 21, further comprising at least one of the following:
the product recovery channel being connected to each of the plurality of vessels via a manifold comprising at least two valves in a parallel flow arrangement;
the purge gas channel being connected to each of the plurality of vessels via a manifold comprising at least two valves in a parallel flow arrangement;
the equalization channel being connected to each of the plurality of vessels via a manifold comprising at least two valves in a parallel flow arrangement;
wherein, when the respective manifolds are present, the control system is configured to:
open the at least two valves in the manifold connecting the product recovery channel sequentially;
open the at least two valves in the manifold connecting the purge gas channel sequentially;
open the at least two valves in the manifold connecting the equalization channel sequentially.

23. The system of claim 22, wherein each of the valves in the respective manifolds is an on/off valve.

24. The system of claim 23, wherein the on/off valves in each respective manifold has a flow orifice of a similar diameter.

25. The system of claim 23, wherein the on/off valves in each respective manifold has a flow orifice of different diameters.

26. The system of claim 25, further comprising at least one of:
a pressure sensor for measuring a pressure in each of the plurality of vessels;
a pressure sensor for measuring a pressure in the waste gas channel; and
a pressure sensor for measuring a pressure in a buffer vessel fluidly connected to the waste gas channel;
wherein the control system is configured to determine a valve failure based upon the pressure measured by at least one of, when present, the pressure sensor in each of the plurality of vessels, the pressure sensor in the waste gas channel, and the pressure sensor in the buffer vessel during the sequential opening of the at least two valves in the manifold connecting the waste gas channel.

27. The system of claim 26, further comprising at least one of:
a pressure sensor for measuring a pressure in each of the plurality of vessels;
a pressure sensor for measuring a pressure in the purge gas channel; and
a pressure sensor for measuring a pressure in a buffer vessel fluidly connected to the purge gas channel;
wherein the control system is configured to determine a valve failure based upon the pressure measured by at least one of, when present, the pressure sensor in each of the plurality of vessels, the pressure sensor in the purge gas channel, and the pressure sensor in the buffer vessel fluidly connected to the purge gas channel during the sequential opening of the at least two valves in the manifold connecting the purge gas channel.

28. The system of claim 27, further comprising at least one of:
a pressure sensor for measuring a pressure in each of the plurality of vessels;
a pressure sensor for measuring a pressure in the product recovery channel; and
a pressure sensor for measuring a pressure in a buffer vessel fluidly connected to the product recovery channel;
wherein the control system is configured to determine a valve failure based upon the pressure measured by at least one of, when present, the pressure sensor in each of the plurality of vessels, the pressure sensor in the product recovery channel, and the pressure sensor in the buffer vessel fluidly connected to the product recovery channel during the sequential opening of the at least two valves in the manifold connecting the product recovery channel.

29. The system of claim 28, further comprising at least one of:
a pressure sensor for measuring a pressure in each of the plurality of vessels;
a pressure sensor for measuring a pressure in the equalization channel; and
a pressure sensor for measuring a pressure in a buffer vessel fluidly connected to the equalization channel;
wherein the control system is configured to determine a valve failure based upon the pressure measured by at least one of, when present, the pressure sensor in each of the plurality of vessels, the pressure sensor in the equalization channel, and the pressure sensor in the buffer vessel fluidly connected to the equalization channel during the sequential opening of the at least two valves in the manifold connecting the equalization channel.

30. The system of claim 29, wherein one or more of the respective manifolds comprises at least three valves, and wherein the control system is configured to open the at least three valves sequentially.

31. A pressure swing adsorption system, comprising:
a plurality of vessels having one or more layers of adsorbent material therein;
a feed gas channel connected to the plurality of vessels;
a product recovery channel connected to the plurality of vessels;
a purge gas channel connected to the plurality of vessels;
a waste gas channel connected to the plurality of vessel; and
an equalization channel connected to the plurality of vessels;
the equalization channel being connected to each of the plurality of vessels via a manifold comprising at least two valves in a parallel flow arrangement; and
a control system configured to open the at least two valves sequentially.

32. The system of claim 31, further comprising at least one of the following:
the product recovery channel being connected to each of the plurality of vessels via a manifold comprising at least two valves in a parallel flow arrangement;

the purge gas channel being connected to each of the plurality of vessels via a manifold comprising at least two valves in a parallel flow arrangement;

the waste gas channel being connected to each of the plurality of vessels via a manifold comprising at least two valves in a parallel flow arrangement;

wherein, when the respective manifolds are present, the control system is configured to:
  open the at least two valves in the manifold connecting the product recovery channel sequentially;
  open the at least two valves in the manifold connecting the purge gas channel sequentially; and
  open the at least two valves in the manifold connecting the waste gas channel sequentially.

33. The system of claim 32, wherein each of the valves in the respective manifolds is an on/off valve.

34. The system of claim 33, wherein the on/off valves in each respective manifold has a flow orifice of a similar diameter.

35. The system of claim 33, wherein the on/off valves in each respective manifold has a flow orifice of different diameters.

36. The system of claim 35, further comprising at least one of:
  a pressure sensor for measuring a pressure in each of the plurality of vessels;
  a pressure sensor for measuring a pressure in the equalization channel; and
  a pressure sensor for measuring a pressure in a buffer vessel fluidly connected to the equalization channel;
  wherein the control system is configured to determine a valve failure based upon the pressure measured by at least one of, when present, the pressure sensor in each of the plurality of vessels, the pressure sensor in the equalization channel, and the pressure sensor in the buffer vessel during the sequential opening of the at least two valves in the manifold connecting the equalization channel.

37. The system of claim 36, further comprising at least one of:
  a pressure sensor for measuring a pressure in each of the plurality of vessels;
  a pressure sensor for measuring a pressure in the purge gas channel; and
  a pressure sensor for measuring a pressure in a buffer vessel fluidly connected to the purge gas channel;
  wherein the control system is configured to determine a valve failure based upon the pressure measured by at least one of, when present, the pressure sensor in each of the plurality of vessels, the pressure sensor in the purge gas channel, and the pressure sensor in the buffer vessel fluidly connected to the purge gas channel during the sequential opening of the at least two valves in the manifold connecting the purge gas channel.

38. The system of claim 37, further comprising at least one of:
  a pressure sensor for measuring a pressure in each of the plurality of vessels;
  a pressure sensor for measuring a pressure in the waste gas channel; and
  a pressure sensor for measuring a pressure in a buffer vessel fluidly connected to the waste gas channel;
  wherein the control system is configured to determine a valve failure based upon the pressure measured by at least one of, when present, the pressure sensor in each of the plurality of vessels, the pressure sensor in the waste gas channel, and the pressure sensor in the buffer vessel fluidly connected to the waste gas channel during the sequential opening of the at least two valves in the manifold connecting the waste gas channel.

39. The system of claim 38, further comprising at least one of:
  a pressure sensor for measuring a pressure in each of the plurality of vessels;
  a pressure sensor for measuring a pressure in the product recovery channel; and
  a pressure sensor for measuring a pressure in a buffer vessel fluidly connected to the product recovery channel;
  wherein the control system is configured to determine a valve failure based upon the pressure measured by at least one of, when present, the pressure sensor in each of the plurality of vessels, the pressure sensor in the product recovery channel, and the pressure sensor in the buffer vessel fluidly connected to the product recovery channel during the sequential opening of the at least two valves in the manifold connecting the product recovery channel.

40. The system of claim 39, wherein one or more of the respective manifolds comprises at least three valves, and wherein the control system is configured to open the at least three valves sequentially.

41. A pressure swing adsorption system, comprising:
  a plurality of vessels having one or more layers of adsorbent material therein;
  a feed gas channel connected to the plurality of vessels;
  a product recovery channel connected to the plurality of vessels;
  a purge gas channel connected to the plurality of vessels;
  a waste gas channel connected to the plurality of vessel; and
  an equalization channel connected to the plurality of vessels;
  the product recovery channel being connected to each of the plurality of vessels via a manifold comprising at least two valves in a parallel flow arrangement;
  the purge gas channel being connected to each of the plurality of vessels via a manifold comprising at least two valves in a parallel flow arrangement;
  the waste gas channel being connected to each of the plurality of vessels via a manifold comprising at least two valves in a parallel flow arrangement;
  the equalization channel being connected to each of the plurality of vessels via a manifold comprising at least two valves in a parallel flow arrangement; and
  a control system configured to:
    open the at least two valves in the manifold connecting the product recovery channel sequentially;
    open the at least two valves in the manifold connecting the purge gas channel sequentially;
    open the at least two valves in the manifold connecting the waste gas channel sequentially; and
    open the at least two valves in the manifold connecting the equalization channel sequentially.

42. The system of claim 41, wherein each of the valves in the respective manifolds is an on/off valve.

43. The system of claim 42, wherein the on/off valves in each respective manifold has a flow orifice of a similar diameter.

44. The system of claim 42, wherein the on/off valves in each respective manifold has a flow orifice of different diameters.

45. The system of claim 44, further comprising at least one of:

a pressure sensor for measuring a pressure in each of the plurality of vessels;

a pressure sensor for measuring a pressure in the product recovery channel; and a pressure sensor for measuring a pressure in a buffer vessel fluidly connected to the product recovery channel;

a pressure sensor for measuring a pressure in the purge gas channel; and a pressure sensor for measuring a pressure in a buffer vessel fluidly connected to the purge gas channel;

a pressure sensor for measuring a pressure in the waste gas channel; and a pressure sensor for measuring a pressure in a buffer vessel fluidly connected to the waste gas channel;

a pressure sensor for measuring a pressure in the equalization channel; and a pressure sensor for measuring a pressure in a buffer vessel fluidly connected to the equalization channel;

wherein the control system is configured to determine a valve failure based upon at least one of:

the pressure measured by at least one of, when present, the pressure sensor in each of the plurality of vessels, the pressure sensor in the product recovery channel, and the pressure sensor in the buffer vessel fluidly connected to the product recovery channel during the sequential opening of the at least two valves in the manifold connecting the product recovery channel;

the pressure measured by at least one of, when present, the pressure sensor in each of the plurality of vessels, the pressure sensor in the purge gas channel, and the pressure sensor in the buffer vessel fluidly connected to the purge gas channel during the sequential opening of the at least two valves in the manifold connecting the purge gas channel;

the pressure measured by at least one of, when present, the pressure sensor in each of the plurality of vessels, the pressure sensor in the waste gas channel, and the pressure sensor in the buffer vessel fluidly connected to the waste gas channel during the sequential opening of the at least two valves in the manifold connecting the waste gas channel;

the pressure measured by at least one of, when present, the pressure sensor in each of the plurality of vessels, the pressure sensor in the equalization channel, and the pressure sensor in the buffer vessel fluidly connected to the equalization channel during the sequential opening of the at least two valves in the manifold connecting the equalization channel.

46. The system of claim 45, wherein one or more of the respective manifolds comprises at least three valves, and wherein the control system is configured to open the at least three valves sequentially.

47. The system of claim 45, wherein the respective at least two valves in a parallel flow arrangement are sized so as to maintain a velocity in the respective vessels below that which would fluidize the adsorbent materials therein.

48. The system of claim 47, wherein the control system is configured to open the valves sequentially based upon a pressure, a pressure differential, a rate of pressure change, or a rate of change in the rate of pressure change.

49. The system of claim 48, further comprising: the feed gas channel being connected to each of the plurality of vessels via a manifold comprising at least two valves in a parallel flow arrangement; and a control system configured to open the at least two feed valves sequentially.

50. A method of operating a pressure swing adsorption system comprising a plurality of vessels, a feed gas channel connected to the plurality of vessels, a product recovery channel connected to the plurality of vessels, a purge gas channel connected to the plurality of vessels, and a waste gas channel connected to the plurality of vessels, the method comprising at least one of:

sequentially opening two or more valves disposed in a parallel flow arrangement and connecting one of the plurality of vessels to the product recovery channel;

sequentially opening two or more valves disposed in a parallel flow arrangement and connecting one of the plurality of vessels to the waste gas channel;

sequentially opening two or more valves disposed in a parallel flow arrangement and connecting one of the plurality of vessels to the equalization channel; and sequentially opening two or more valves disposed in a parallel flow arrangement and connecting one of the plurality of vessels to the purge gas channel.

51. The method of claim 50, further comprising opening a redundant valve disposed in a parallel flow arrangement in response to a valve failure.

* * * * *